United States Patent
Nagaoka et al.

(10) Patent No.: US 8,458,512 B2
(45) Date of Patent: Jun. 4, 2013

(54) VARIABLE-LENGTH DATA STORING METHOD AND VARIABLE-LENGTH DATA STORING DEVICE

(75) Inventors: Hirofumi Nagaoka, Kawasaki (JP); Yasuhiro Watanabe, Kawasaki (JP); Taro Hagiya, Nerima (JP)

(73) Assignee: Fujitsu Limited, Kawasaki (JP)

( * ) Notice: Subject to any disclaimer, the term of this patent is extended or adjusted under 35 U.S.C. 154(b) by 697 days.

(21) Appl. No.: 12/731,090

(22) Filed: Mar. 24, 2010

(65) Prior Publication Data
US 2010/0241897 A1    Sep. 23, 2010

Related U.S. Application Data

(63) Continuation of application No. PCT/JP2007/001044, filed on Sep. 26, 2007.

(51) Int. Cl.
*G06F 11/00* (2006.01)

(52) U.S. Cl.
USPC .............. 714/6.1; 714/42; 714/6.2; 714/6.32; 714/25

(58) Field of Classification Search
USPC ........................ 714/6.1, 6.11, 6.32, 25, 42, 48
See application file for complete search history.

(56) References Cited

U.S. PATENT DOCUMENTS
2003/0147469 A1    8/2003  Byun

FOREIGN PATENT DOCUMENTS

| JP | 10-145789 A | 5/1998 |
|----|----|----|
| JP | 10-336582 A | 12/1998 |
| JP | 2003-163904 A | 6/2003 |
| JP | 2003-289541 A | 10/2003 |
| JP | 2006-128920 A | 5/2006 |
| JP | 2007-243784 A | 9/2007 |

*Primary Examiner* — Scott Baderman
*Assistant Examiner* — Sarai Butler
(74) *Attorney, Agent, or Firm* — Arent Fox LLP

(57) ABSTRACT

In order to enable a rewrite of stored data to be omitted and to reduce a processing time of error concealment even if an error is detected in a process for sequentially storing variable-length data in a memory and the rewrite of the stored data is necessary, variable-length data from which an error is not detected is sequentially stored at and after a predetermined position in the memory, and error information that includes a restoration address that corresponds to an area in which variable-length data from which an error is detected is to be stored and that specifies variable-length data stored earliest in the memory from among data to be replaced with error concealment data is stored at a position preceding the predetermined position, when the error is detected.

15 Claims, 25 Drawing Sheets

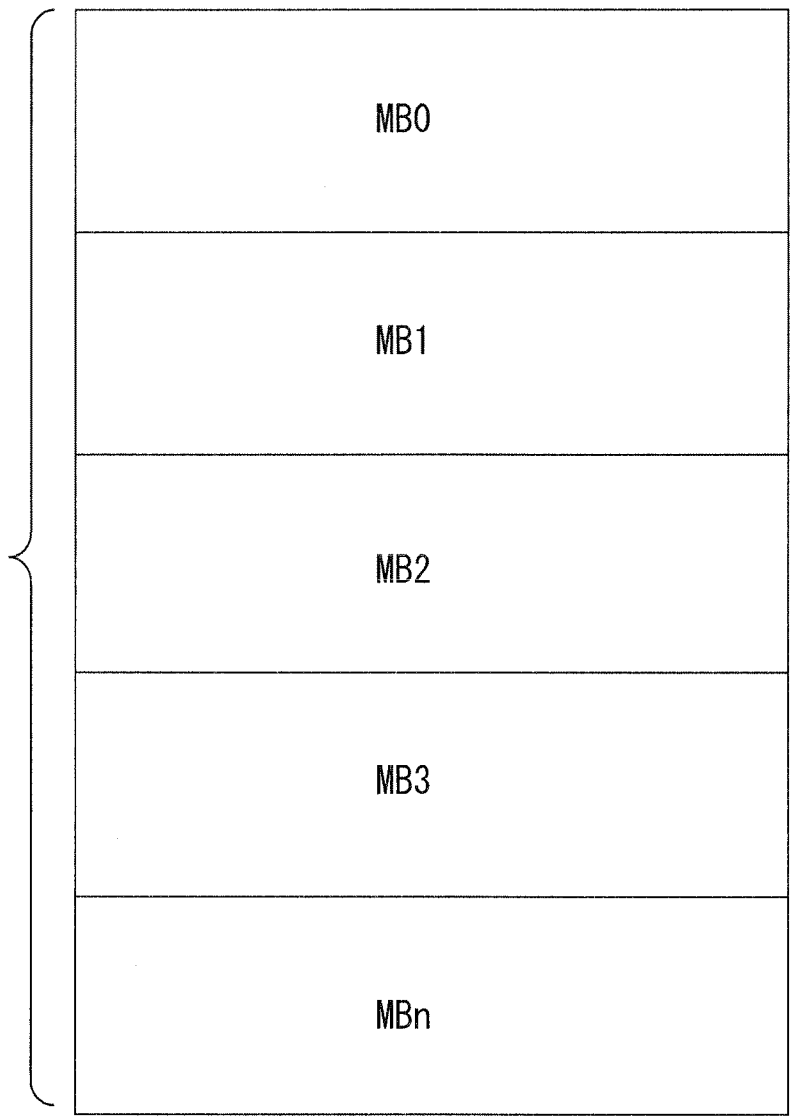
F I G. 3

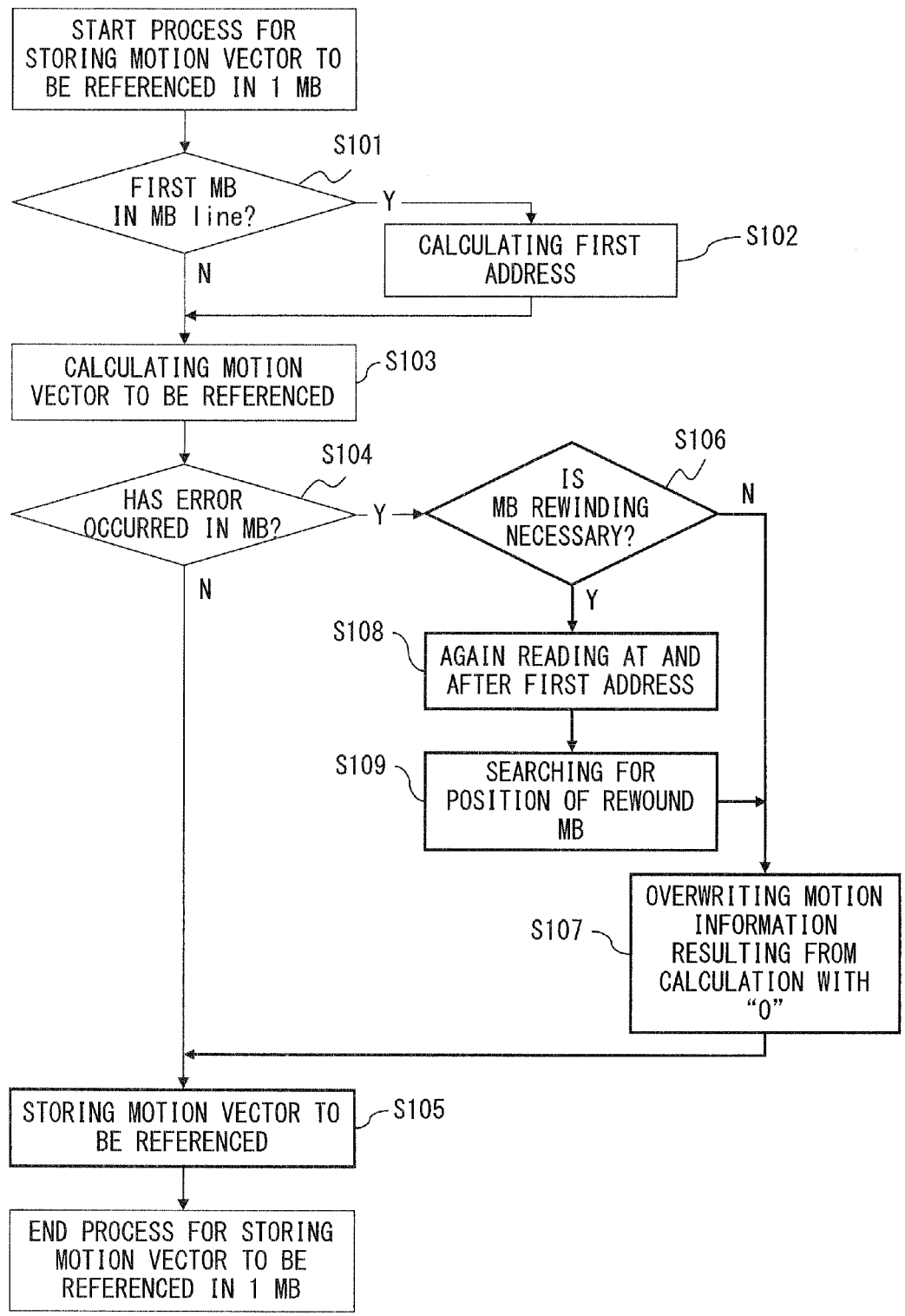
F I G. 6

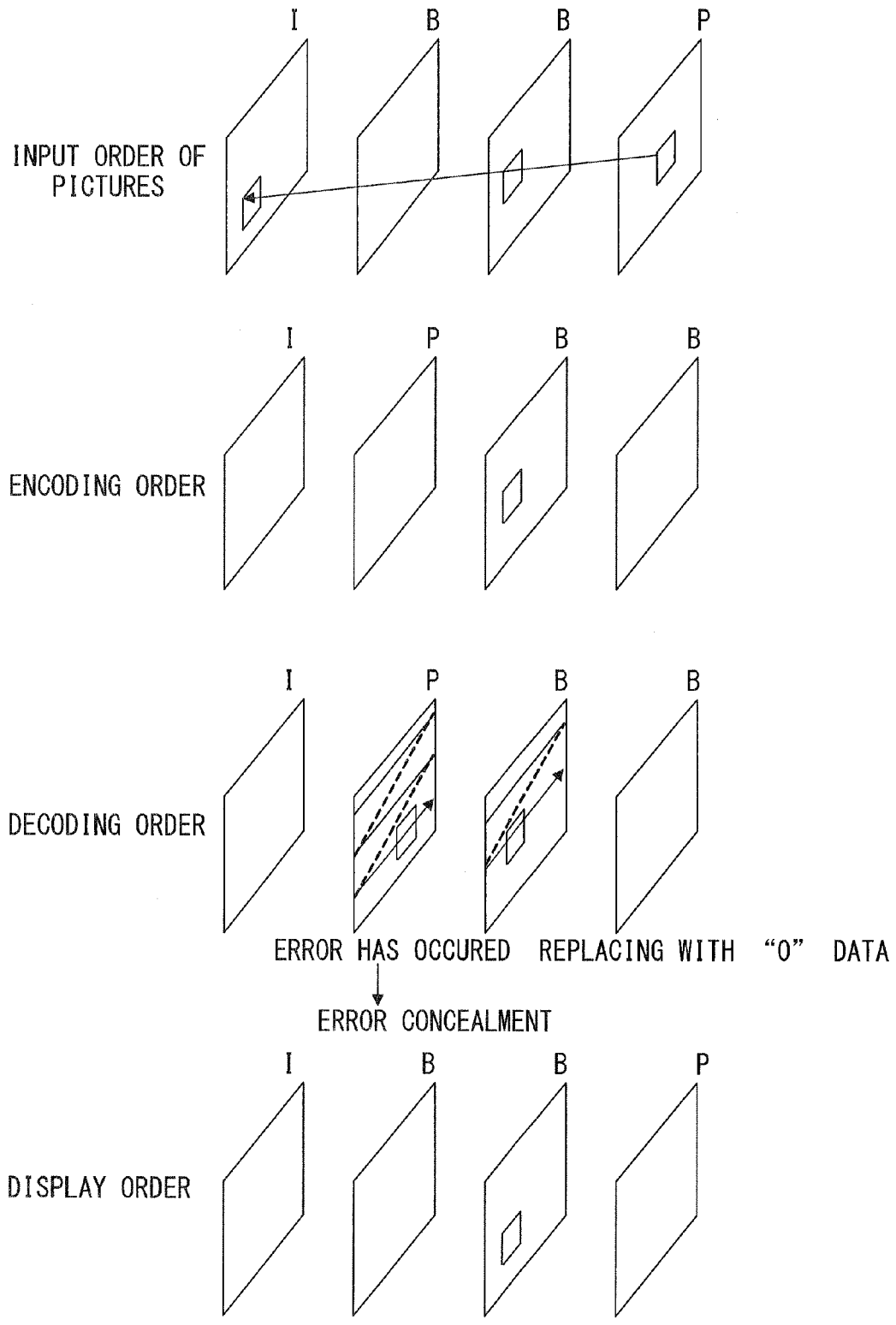
F I G. 1 2

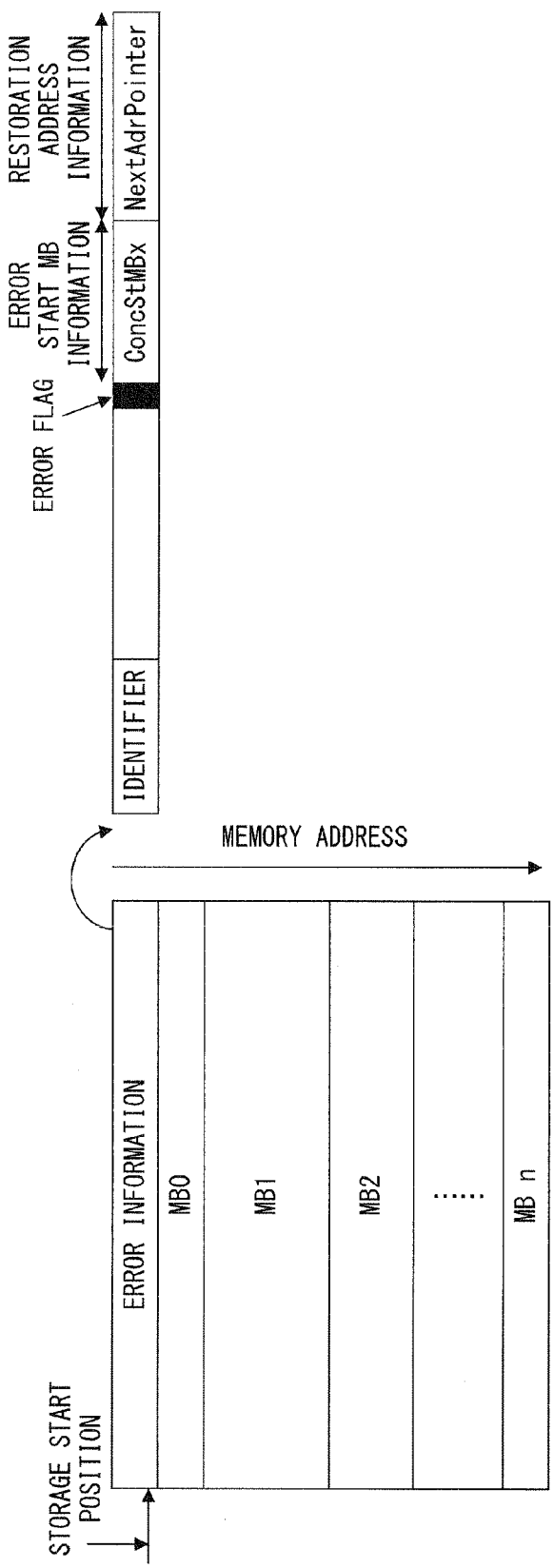
F I G. 1 4

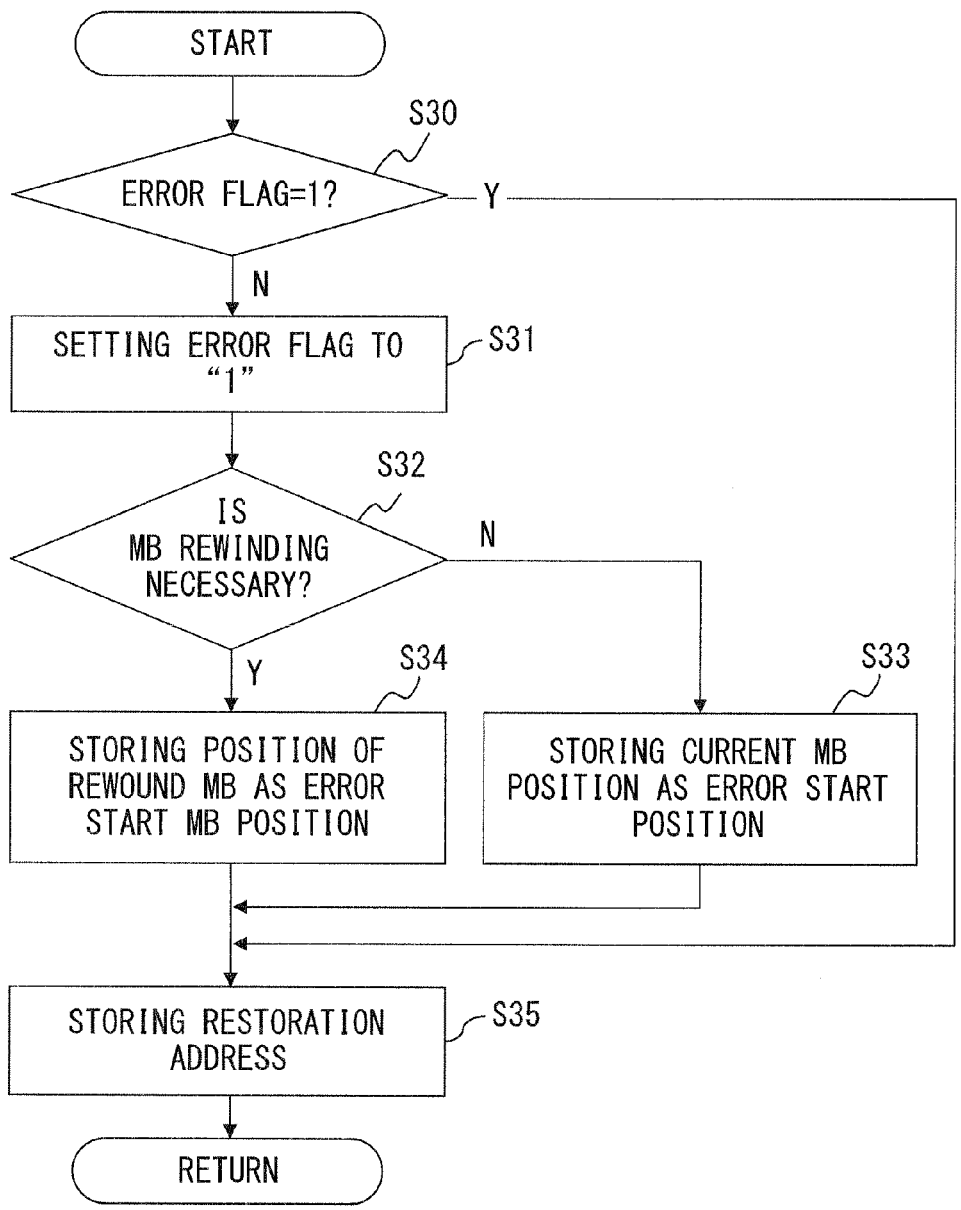
F I G. 16

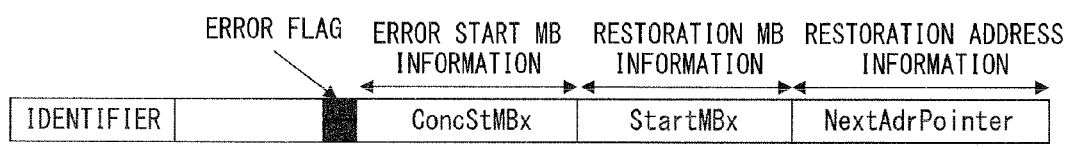
F I G. 2 0

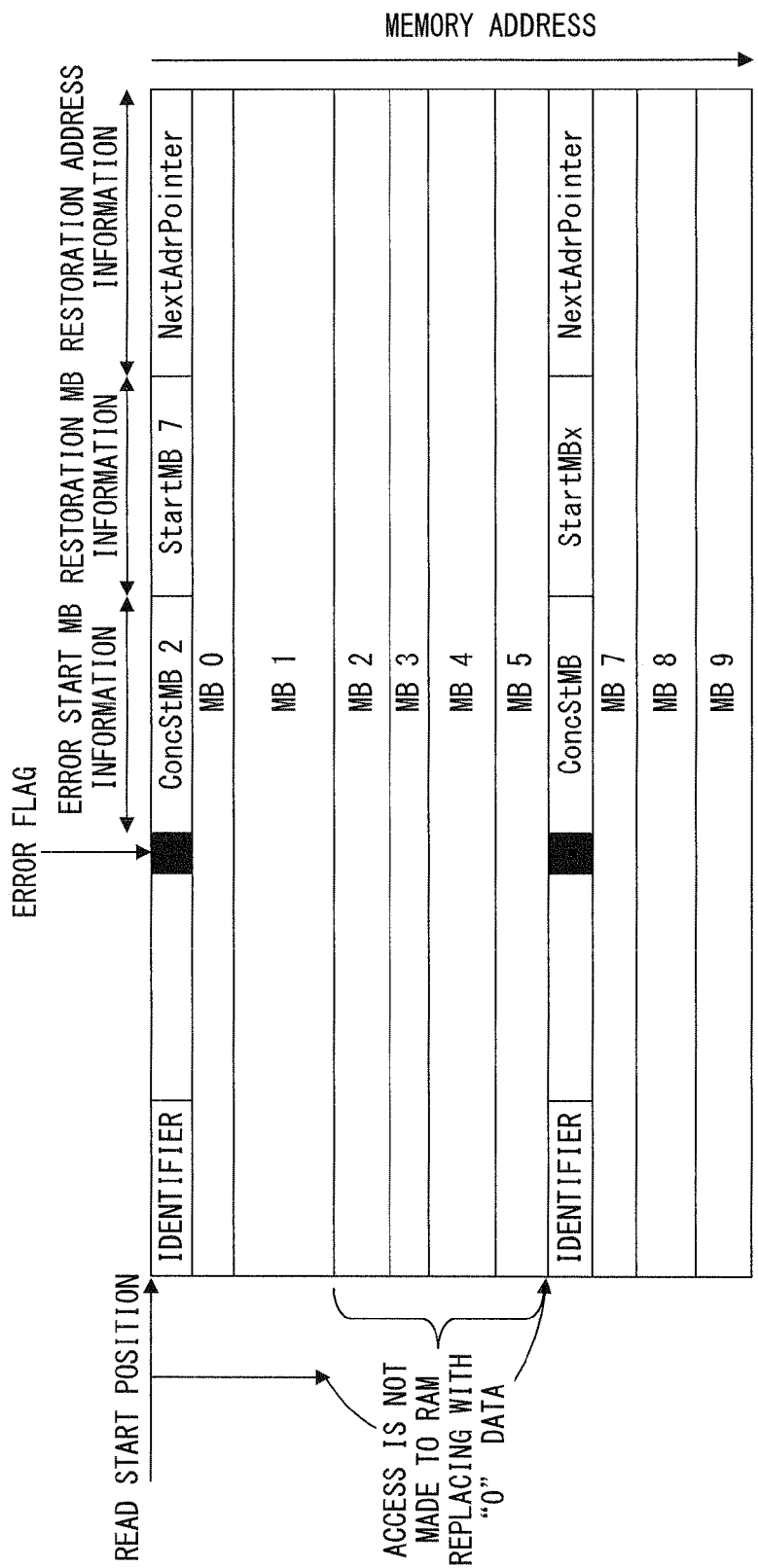
F I G. 25

VARIABLE-LENGTH DATA STORING METHOD AND VARIABLE-LENGTH DATA STORING DEVICE

CROSS-REFERENCE TO RELATED APPLICATIONS

This application is a continuation of PCT application PCT/JP2007/001044, which was filed on Sep. 26, 2007.

FIELD

The embodiments disclosed herein are related to a method for storing variable-length data in a memory and a device thereof.

BACKGROUND

In recent years, digital broadcasting or network broadcasting using a moving picture encoding method such as MPEG (Moving Picture Experts Group), moving picture distribution using digital data, and the like have been actively performed. Such moving picture encoding methods enable moving picture data of a high resolution to be transferred by encoding moving pictures at a high compression ratio. Such moving picture compression techniques include motion compensation methods, one of which is a direct mode technique. The direct mode is an encoding mode for predicting and generating motion information on the basis of the motion information of encoded blocks. The number of bits that are necessary to encode motion information becomes unnecessary in the direct mode, leading to an increase in compression efficiency.

FIG. 1 is an explanatory view of the concept of a time direct mode as such a direct mode. In the time direct mode, a motion vector mvCo1 of an anchor block that is located in the same position as a target block in an anchor picture is scaled by using a time interval tb between a reference picture and a target picture, and a time interval td between the reference picture and the anchor picture. A motion vector mvL0 for L0 prediction as forward prediction and a motion vector mvL1 for L1 prediction as backward prediction are obtained with the following equations.

$$mvL0=mvCo1 \times tb/td$$

$$mvL1=-mvCo1 \times (td-tb)/td=mvL0-mvCo1$$

In a process for decoding moving picture data that is encoded in such a direct mode, a process for storing, in a memory, all pieces of information of motion vectors that can be possibly referenced in the direct mode is necessary when encoded picture data is decoded.

FIG. 2 illustrates an example of motion vector information that can possibly be referenced in a process executed in the direct mode as described above. In FIG. 2, the number of motion vectors for one macro block (MB) that is configured with, for example, 16×16 pixels is not fixed. Additionally, the size of an area from which motion vectors are obtained varies with a change in the number of motion vectors. Therefore, motion vectors for one macro block (MB) include many patterns of motion vectors.

FIG. 3 is an explanatory view of one example of a method for storing such motion vector information to be referenced in a memory. In FIG. 3, a fixed-size memory area is allocated to variable-length motion vector information the length of which varies due to variations in the patterns of macro blocks (MBs), and the variable-length motion vector information is stored in this memory area. If a fixed-size memory area is allocated in units of macro blocks, it is always necessary to transfer data of a fixed size when motion vector information is transferred, and the amount of processing for accessing the memory becomes extremely large.

FIGS. 4 and 5 are explanatory views of another method for storing, in a memory, variable-length data each having a different number of motion vectors and a different sized area from which motion vectors are detected, with respect to each of the macro blocks. In FIG. 4, for example, the number of motion vectors for a macro block 0 is two, and the number of motion vectors for a macro block 3 is seven.

FIG. 5 illustrates the method for storing motion vector information in which a variable-length area within the memory is allocated in accordance with the data length of motion vectors illustrated in FIG. 4. Information of motion vectors for each of the macro blocks illustrated in FIG. 4 is stored in variable-length areas in accordance with the number of motion vectors, or the like.

Processes for writing/reading motion vector information to be referenced to/from a memory in a conventional example of the method for storing motion vector information to be referenced in the memory in FIG. 5 are described with reference to FIGS. 6 to 9. FIG. 6 is a flowchart illustrating a motion vector information storing process executed in the conventional example of the method for storing motion vector information in the memory. This is a flowchart illustrating the details of the process for storing a motion vector to be referenced for one macro block (MB).

Once the process is started in FIG. 6, whether or not this process is a process executed for the first macro block of a macro block line is determined in step S101. Here, a fixed-size area within the memory is allocated to one macro block line (namely, a horizontal row of macro blocks). If this process is the process for the first macro block of the macro block line, it is necessary to store motion vector information to be referenced for the first macro block at the beginning of the fixed-size area allocated as described above. Accordingly, the flow goes to step S103 after the first address of that area is calculated in step S102. If this process is not the process for the first macro block of the macro block line, the flow immediately goes to step S103, in which a motion vector to be referenced for the corresponding macro block is calculated.

In step S104, whether or not an error has occurred in the calculation of the motion vector to be referenced is determined. If the error does not occur, the motion vector to be referenced is stored in step S105. Then, the process for storing a motion vector to be referenced is continued for the next macro block.

If it is determined in step S104 that an error has occurred, whether or not a macro block rewinding process is necessary is determined in step S106. If a motion vector to be referenced is miscalculated due to, for example, a loss of picture data or the like, the miscalculated motion vector exerts a lot of influence on the motion vector information of the macro block, which is calculated by using the miscalculated motion vector information, directly leading to deterioration in picture quality. Accordingly, it is desirable to execute a motion prediction process in the direct mode by replacing the motion vector information to be referenced with, for example, "0", without using the motion vector information of the macro block in which the error has occurred. For example, the H.264 picture compression method using the direct mode does not stipulate the details of the process executed at the time of data decoding when error has occurred. However, the following description is provided by assuming that the motion prediction process in the direct mode is executed by replacing with "0" the motion vector information of a macro block where an error has occurred.

Additionally, if an error is detected from a macro block, there is a high possibility that picture quality will be deteriorated also in a macro block which is positioned preceding the macro block from which the error is detected and for which the process for storing a motion vector to be referenced has been completed. In this case, by executing an error concealment process after rewinding to the macro block positioned preceding the macro block from which the error is detected, the deterioration in the picture quality which is caused by the detected error can be prevented from occurring in the macro block positioned preceding the macro block where the error has occurred.

In step S106, whether or not such a macro block rewinding process is necessary is determined. If such a macro block rewinding process is not necessary, motion vector information resulting from the calculation performed for the macro block from which the error is detected is overwritten with "0" in step S107. In step S105, the motion vector to be referenced is stored.

If, for example, the macro block rewinding process is determined to be necessary empirically, and up to which macro block to be rewound is determined in step S106, the memory is again read at and after the first address of the motion vector information storage area for one macro block line, which is described with reference to FIG. 5 in step S108. The position of the macro block to be rewound, namely, the position of the macro block for which the error concealment process is to be executed is searched for in step S109. In step S107, the motion vector information resulting from the calculation is overwritten with "0" at and after the position of the rewound macro block. In step S105, the value of the motion vector to be referenced is overwritten with "0" in a range from the position of the rewound macro block to the position of the macro block from which the error is detected. Then, the process for storing a motion vector to be referenced is continued for the next macro block.

FIG. 7 is an explanatory view of results of writing motion vector information to be referenced by executing the process of FIG. 6. In FIG. 7, variable-length motion vector information of the macro block (MB) 0 and subsequent blocks are sequentially written to a fixed-size area that is described with reference to FIG. 5 and intended to store motion vector information for one macro block line. Here, assuming that an error is detected from the macro block 5, whether or not the macro block rewinding process is necessary is determined in step S106 upon detection of the error. If the process for rewinding up to the macro block 2 is determined to be necessary, data indicating that the motion vector information to be referenced is "0" is written as the data of the macro blocks 2 to 5. If an error is detected also from the macro block 6, the macro block rewinding process is determined to not be necessary in step S106. "0" is written also to the macro block 6 in steps S107 and S105. Then, subsequent processes are continued.

FIG. 8 is a flowchart illustrating the process for reading motion vector information in the conventional example of the method for storing motion vector information in FIG. 5. FIG. 8 is a flowchart illustrating the process for reading a motion vector to be referenced for one macro block, which corresponds to FIG. 6. Once the process is started, whether or not this process is a process for the first macro block of one macro block line is determined in step S111. If this process is the process for the first macro block, the first address of the one macro block line is set as an address of a RAM for storing motion vector information in step S112. Then, the flow goes to step S113 after the RAM is read. If this process is not the process for the first macro block, the flow immediately goes to step S113, in which the motion vector information to be referenced is read. In step S114, a direct vector is calculated. Then, the process for reading a motion vector to be referenced for the one macro block is terminated.

FIG. 9 is an explanatory view of the method for reading motion vector information to be referenced, the method being implemented with the process of FIG. 8. In FIG. 9, motion vector information to be referenced is read from the first macro block (namely, an MB (macro block) 0) and subsequent blocks of the macro block line. Here, "0", which is stored as motion vector information in the memory, is read for the macro blocks 2 to 6.

The conventional example of the method for storing variable-length motion vector information of macro blocks in a memory and the processes for reading/writing the motion vector information stored with the conventional method have been described above in detail. However, an address at which motion vector information of a macro block to be rewound is stored cannot be uniquely obtained if an error is detected from a macro block and it is necessary to execute the error concealment process after rewinding to a macro block positioned preceding the macro block from which the error is detected. Accordingly, it is necessary to search for the information of the motion vector at the rewound position by again reading the content of the memory at and after the first address, and to replace the motion vector information with "0" at and after the rewound position. For such processes, an extremely large number of memory accesses and a long processing time are necessary.

Japanese Laid-open Patent Publication No. 2006-128920 "Error Concealment Method and Apparatus in Picture Signal Decoding System" discloses the technique for setting a motion vector in an area replacing an error area to "0" on the basis of a result of comparing a difference between a predicted motion vector in the error area and a motion vector in an adjacent area with a threshold value, or for adding a compensation value to the predicted motion vector in the error area in order to make a resultant vector function as the motion vector in the area replacing the error area.

SUMMARY

According to an aspect of an embodiment, a method for storing variable-length data in a memory includes detecting an error from provided variable-length data; sequentially storing variable-length data from which an error has not been detected at and after a predetermined position in the memory; and storing, in the memory, error information that correspondingly includes a restoration address at which variable-length data from which an error has not been detected is to be stored after an area of the memory where the variable-length data from which the error is detected is to be stored, and that specifies variable-length data stored earliest in the memory from among variable-length data to be replaced with error concealment data in order to cope with an error, when the error is detected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is an explanatory view of a conventional example of a method for storing motion vector information in a fixed-size area;

FIG. 6 is a flowchart illustrating a process for storing motion vector information in the conventional example of FIG. 5;

FIG. 12 is an explanatory view of input, encoding, decoding, and display orders of pictures;

FIG. 14 is an explanatory view of a method for storing error information in the memory in a first embodiment;

FIG. 16 is a flowchart illustrating the details of an error information holding process in FIG. 15;

FIG. 20 is an explanatory view of a method for storing error information in a second embodiment;

FIG. 25 is an explanatory view of an example of reading motion vector information to be referenced by executing the process of FIG. 24.

DESCRIPTION OF EMBODIMENTS

Figure 1:
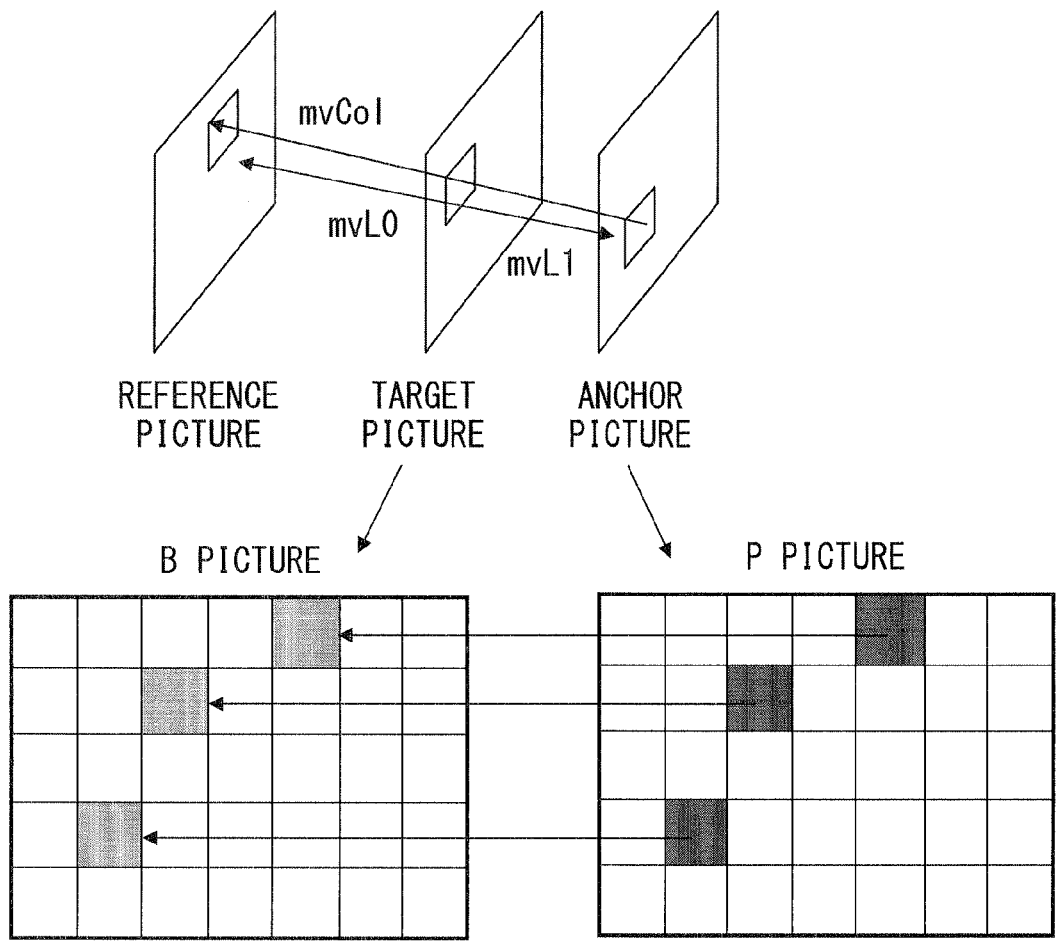
FIG. 1 is an explanatory view of the outline of a direct mode process.
Figure 2:
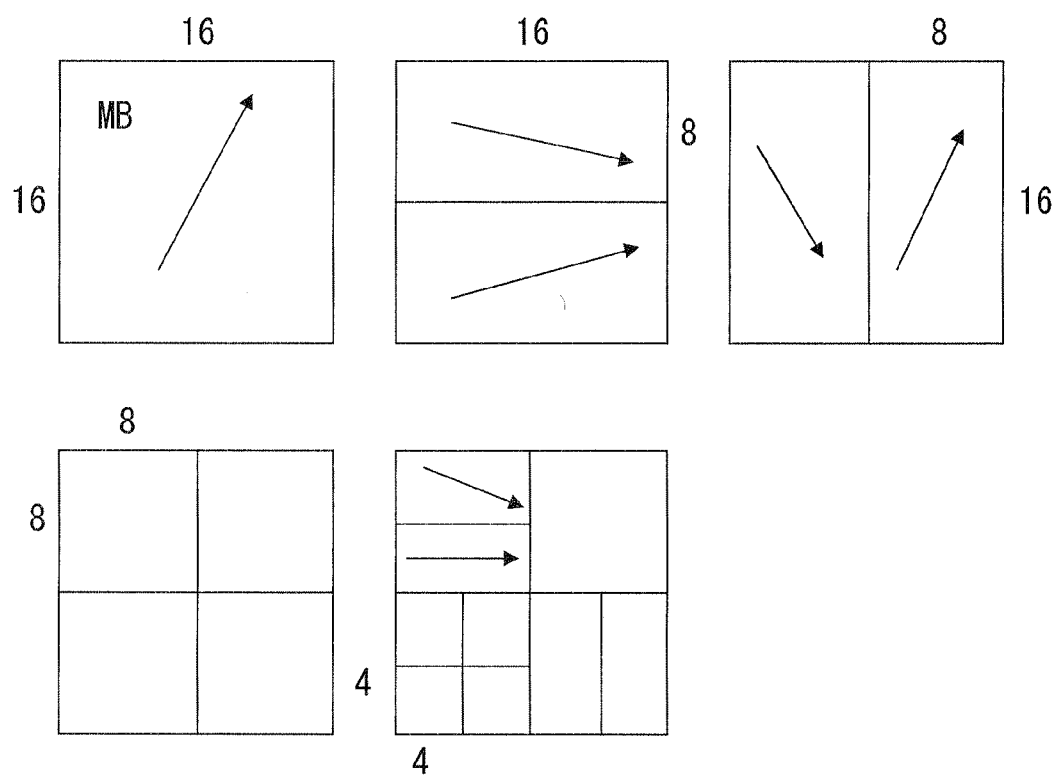
FIG. 2 is an explanatory view of motion vectors to be referenced used in the direct mode process.
Figure 4:
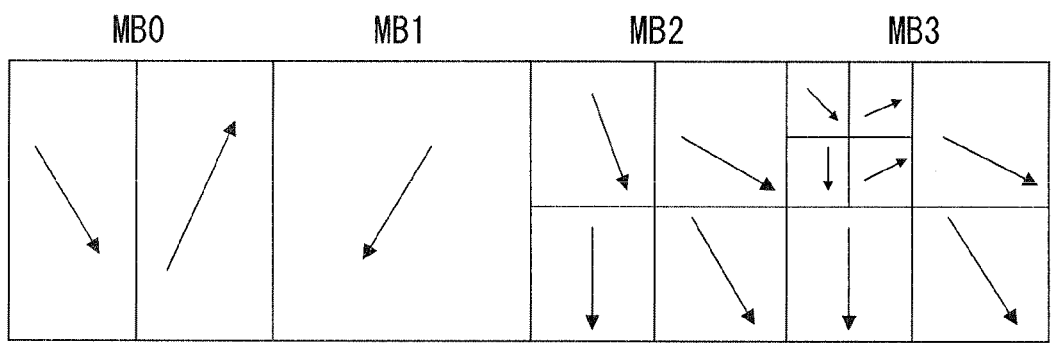
FIG. 4 is an explanatory view of various patterns of motion vectors to be referenced for macro blocks.
Figure 5:
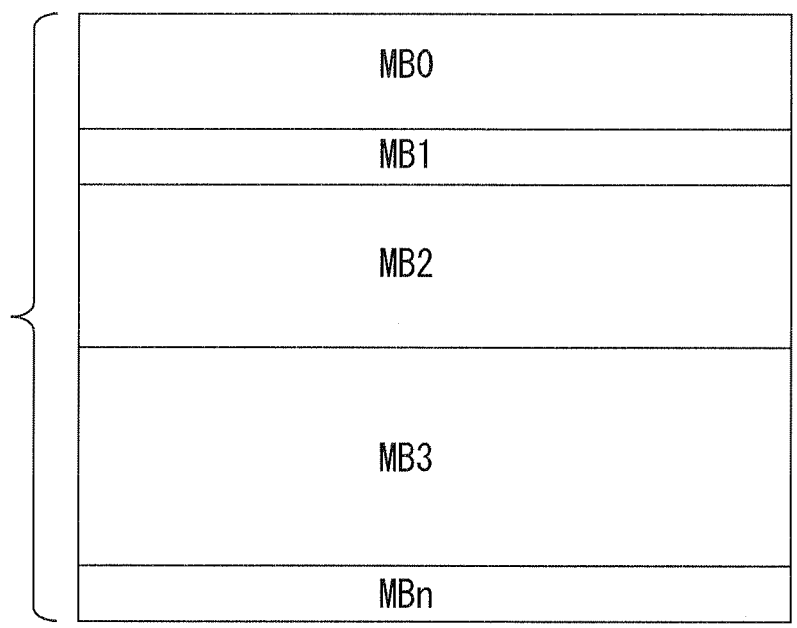
FIG. 5 is an explanatory view of a conventional example of a method for sequentially storing variable-length motion vector information in a memory.
Figure 7:
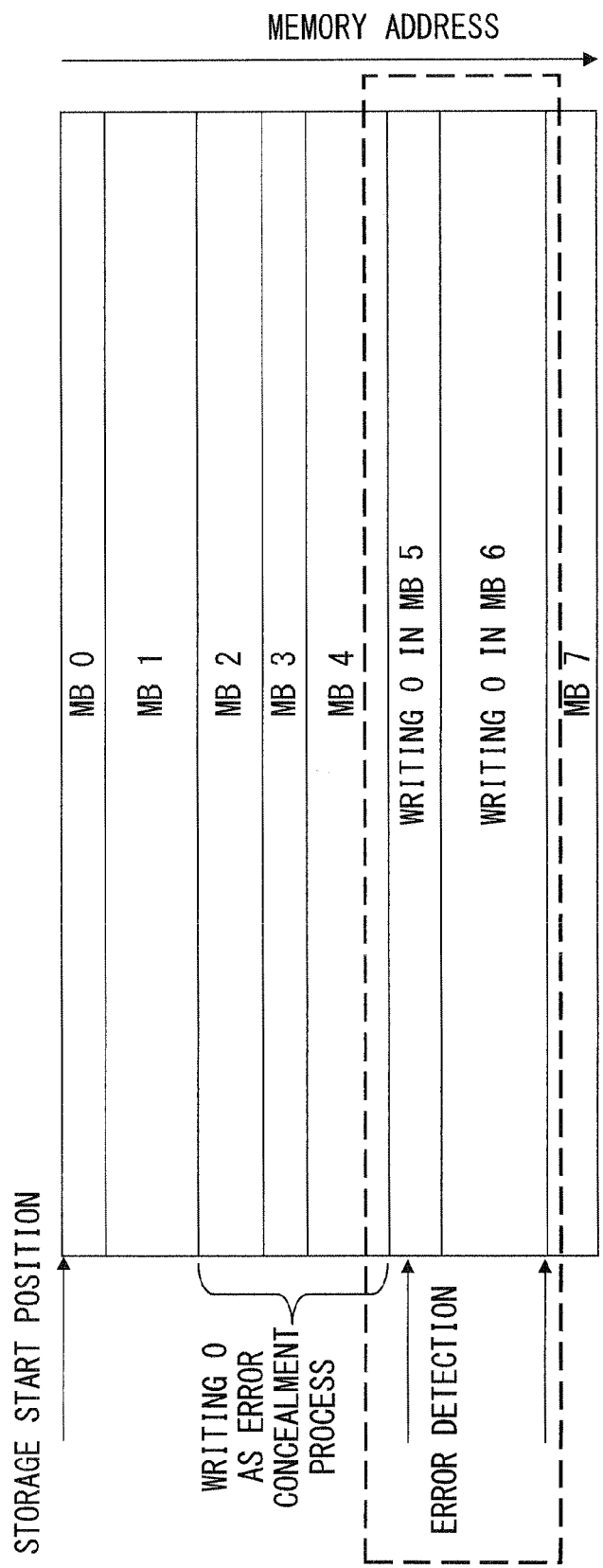
FIG. 7 is an explanatory view of an example of writing motion vector information to be referenced to the memory by executing the process of FIG. 6.
Figure 8:
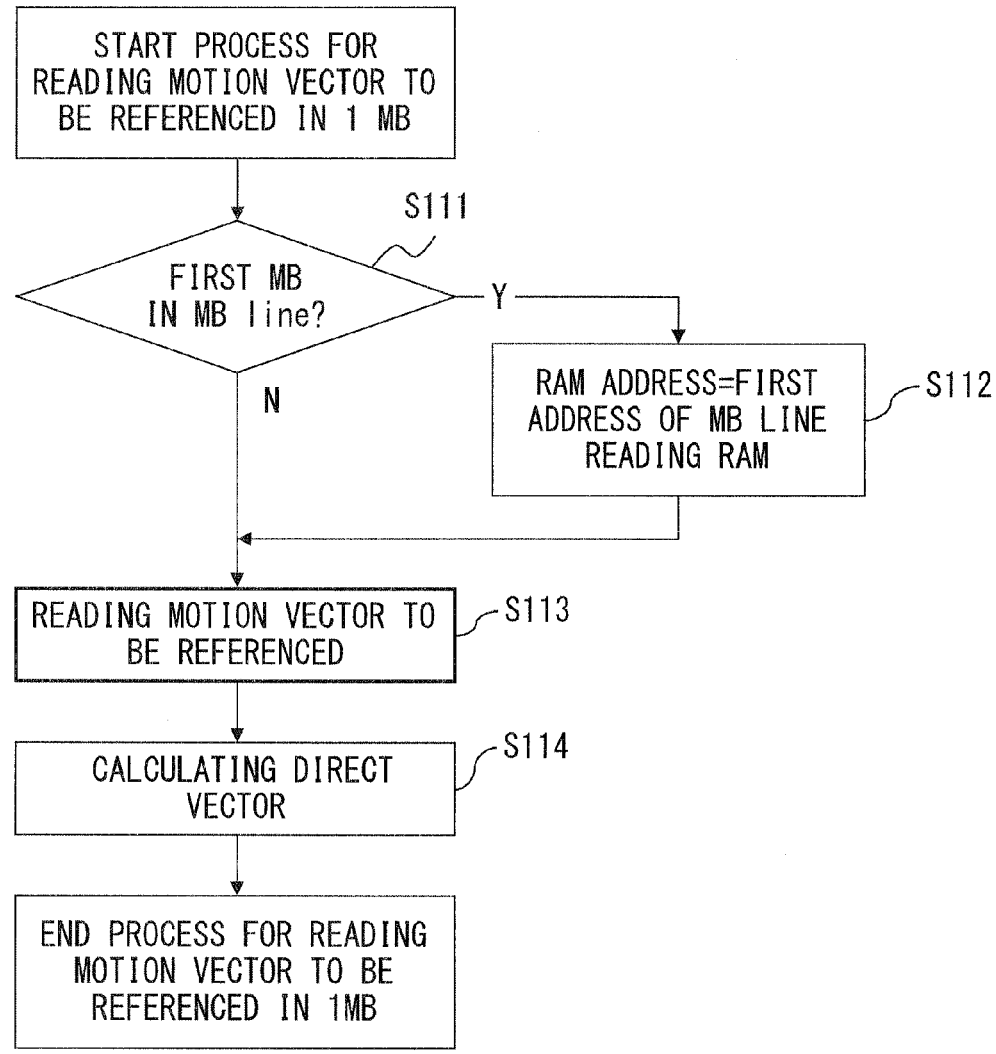
FIG. 8 is a flowchart illustrating a process for reading motion vector information in the conventional example of FIG. 5.
Figure 9:
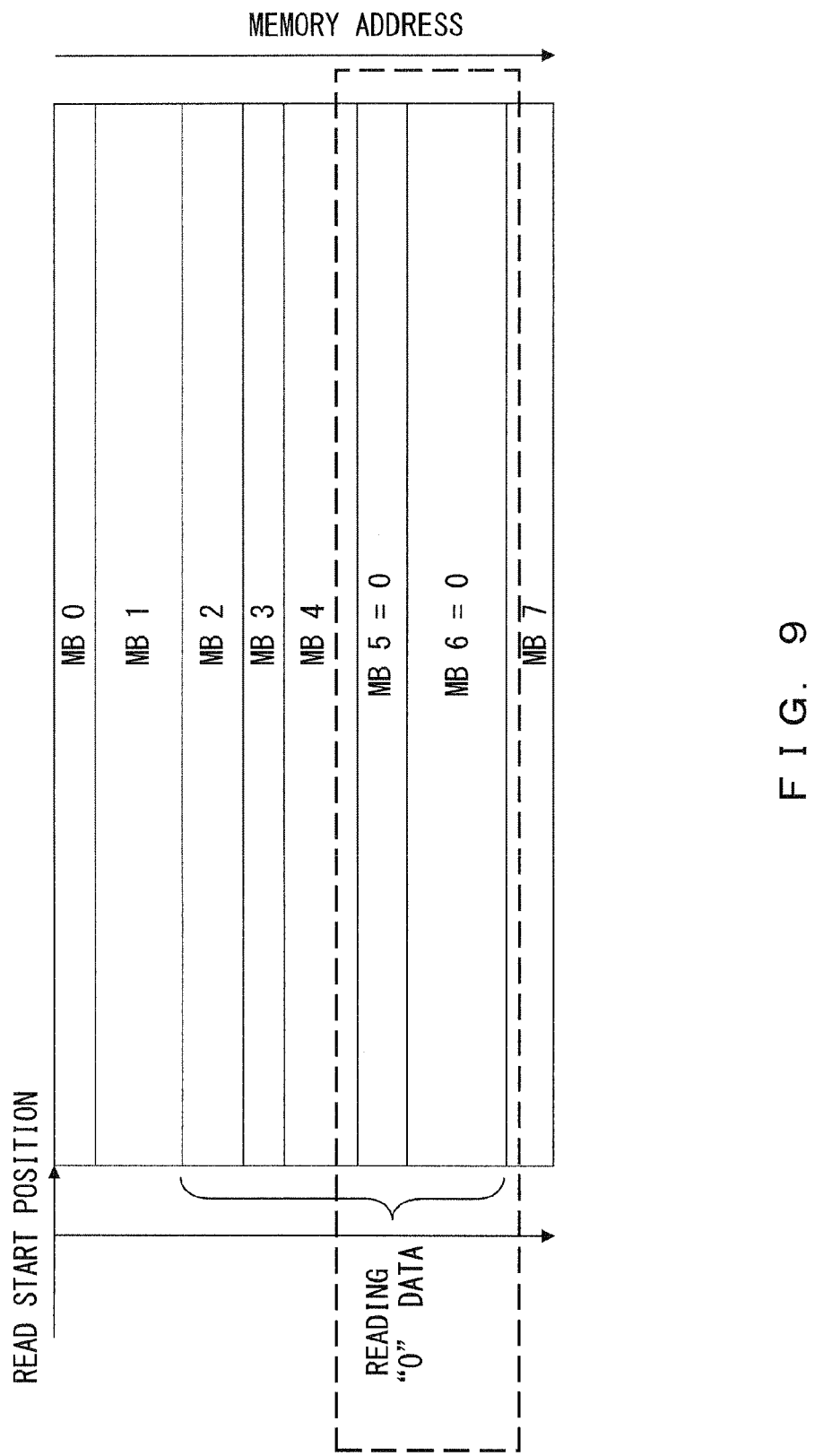
FIG. 9 is an explanatory view of an example of reading motion vector information to be referenced from the memory by executing the process of FIG. 8.
Figure 10:
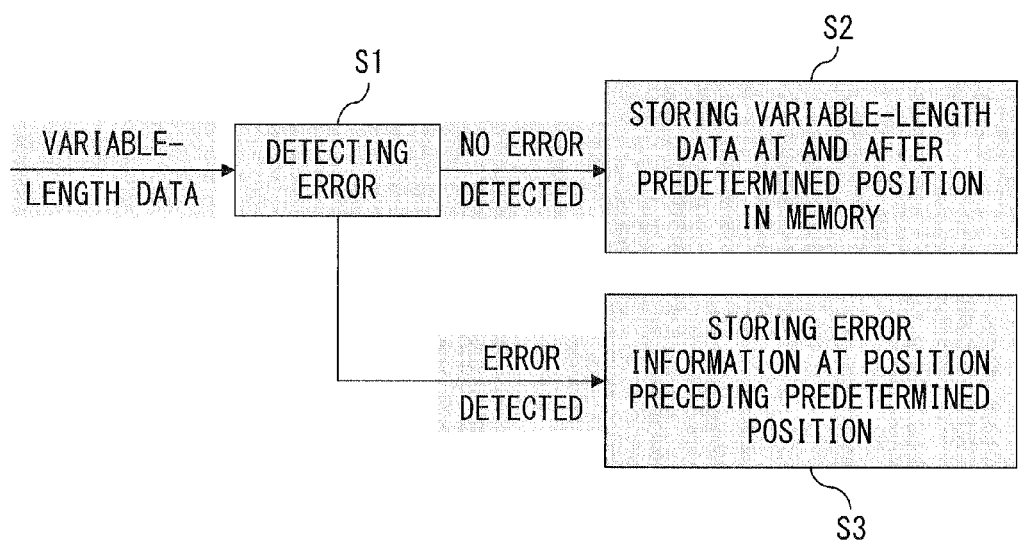
FIG. 10 is a functional block diagram of a method for storing variable-length data in the memory.

FIG. 10 is a functional block diagram illustrating a method for storing, in a memory, variable-length data in an embodiment. This figure is a functional block diagram illustrating the method for sequentially storing a plurality of pieces of variable-length data such as data of motion vectors to be referenced in a memory.

In FIG. 10, error detection is made for input variable-length data in step S1. If an error is not detected, variable-length data is sequentially written at and after a predetermined position in a memory. If the error is detected, error information corresponding to the error is written to a position preceding the predetermined position within the memory. This error information includes, as a restoration address, an address in a memory area to which the variable-length data, from which the error is detected, is to be written (for example, an address next to the end address of the memory area to which the variable-length data, from which the error is detected, is to be written). Moreover, this error information specifies the earliest input variable-length data from among variable-length data to be replaced, correspondingly to the detected error, with error concealment data such as "0".

If the variable-length data is the data of a motion vector to be referenced, then an address (for example, an address next to the end address) next to the memory area to which the data of a motion vector to be referenced for the macro block from which an error is detected is to be written, and the data of the earliest stored motion vector to be referenced from among macro blocks the motion vector to be referenced of which is to be replaced with "0" as a macro block rewinding process, are specified on the basis of the error information. When the data of the motion vector to be referenced is read, the data of the motion vector to be referenced in a range from the data of the earliest stored motion vector in memory to be referenced to the data of the motion vector to be referenced for a macro block preceding the data of macro blocks stored at and after the address next to the above described end address is replaced with "0" as error concealment data, and the replaced data is output.

Figure 11:
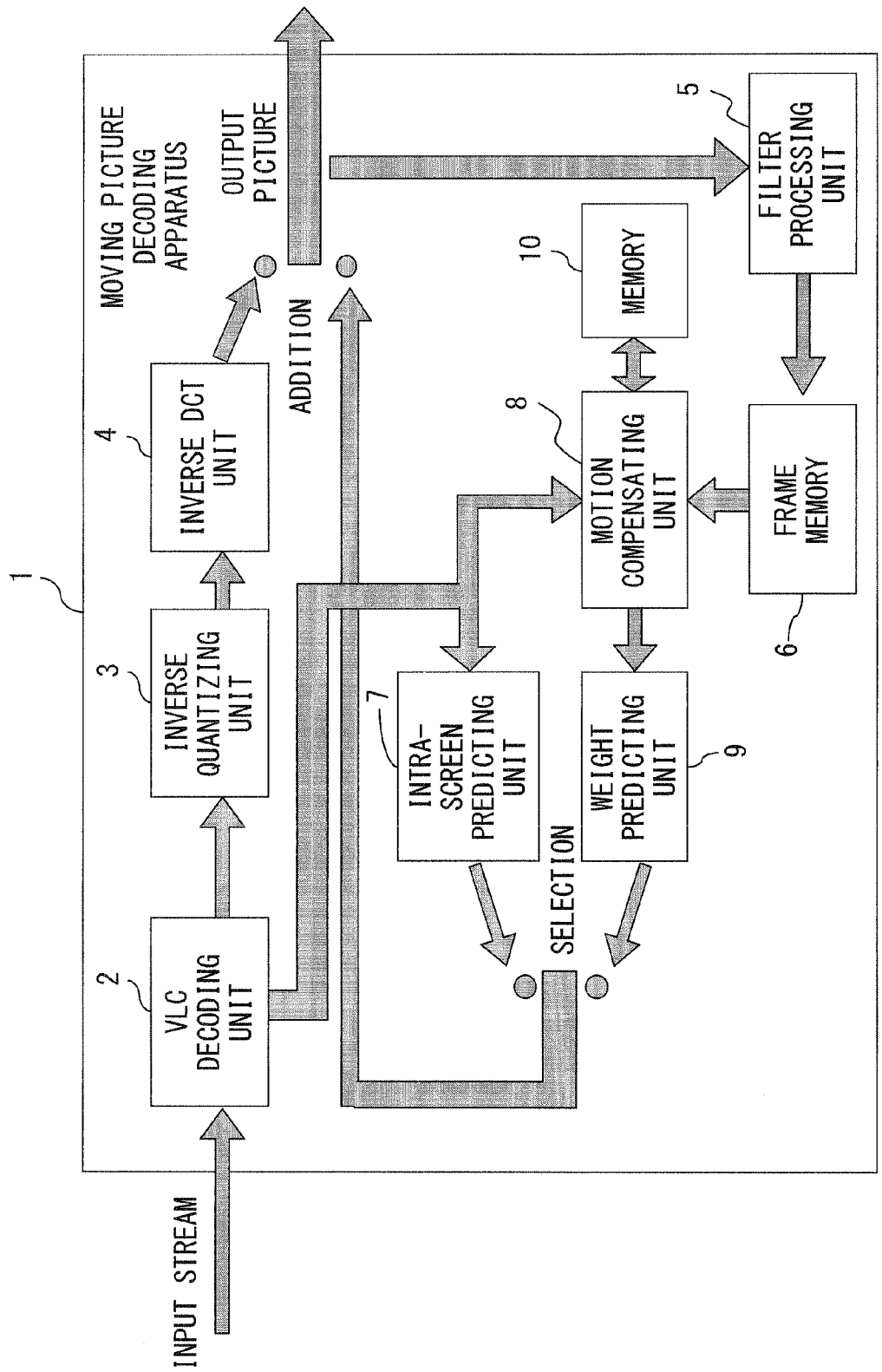
FIG. 11 is a block diagram illustrating an example of a configuration of a moving picture decoding apparatus.

FIG. 11 is a block diagram illustrating an example of a configuration of a moving picture decoding apparatus in the embodiment. In this figure, the moving picture decoding apparatus 1 includes a VLC (Variable Length Code) decoding unit 2, an inverse quantizing unit 3, an inverse DCT unit 4, a filter processing unit 5, a frame memory 6, an intra-screen predicting unit 7, a motion compensating unit 8, a weight predicting unit 9, and a memory 10.

In FIG. 11, input stream data is provided to the VLC decoding unit 2, which decodes the stream data. Then, the data is inversely quantized by the inverse quantizing unit 3. Thereafter, the data is inverse-discrete-cosine transformed by the inverse DCT unit 4.

Results of the decoding made by the VLC decoding unit 2 are provided also to the intra-screen predicting unit 7 and the motion compensating unit 8. If intra-screen prediction (namely, an intra-frame prediction method) is used, the output of the intra-screen predicting unit 7 is selected. The output of the intra-screen predicting unit 7 is added to the output of the inverse DCT unit 4, and an added result is externally output as an output picture.

The output picture is provided also to the filter processing unit 5. Results of the filter process executed by the filter processing unit 5 are stored in the frame memory 6, and are motion-compensated by the motion compensating unit 8. In accordance with the results of the motion compensation, the weight predicting unit 9 executes a process corresponding to the inter-frame prediction, and the output of the weight predicting unit 9 is selected. The output of the weight predicting unit 9 is added to the output of the inverse DCT unit 4, and an added result is externally output as an output picture. At this time, a motion vector to be referenced is calculated by the motion compensating unit 8. Results of this calculation are stored in the memory 10 such as a RAM, and are read from the memory 10 and used in a calculation performed in the direct mode process. The memory 10 (such as the RAM) is sometimes provided outside the moving picture decoding apparatus such as a decoder chip when being mounted. Here, the memory 10 is included in the moving picture decoding apparatus 1 as a configuration example.

FIG. 12 is an explanatory view of input, encoding, decoding, and display orders of pictures within an input stream in this embodiment. The input order of pictures is the order of an I picture, two B pictures, and a P picture. However, the encoding and the decoding orders are the order of an I picture, a P picture, and two B pictures. The display order is the same as the input order of pictures. If an error has occurred in a macro block of, for example, a P picture in the decoding process of this embodiment, the value of a motion vector to be referenced for the macro block is replaced with "0" as an error concealment process. Then, a decoding process is executed.

Figure 13:
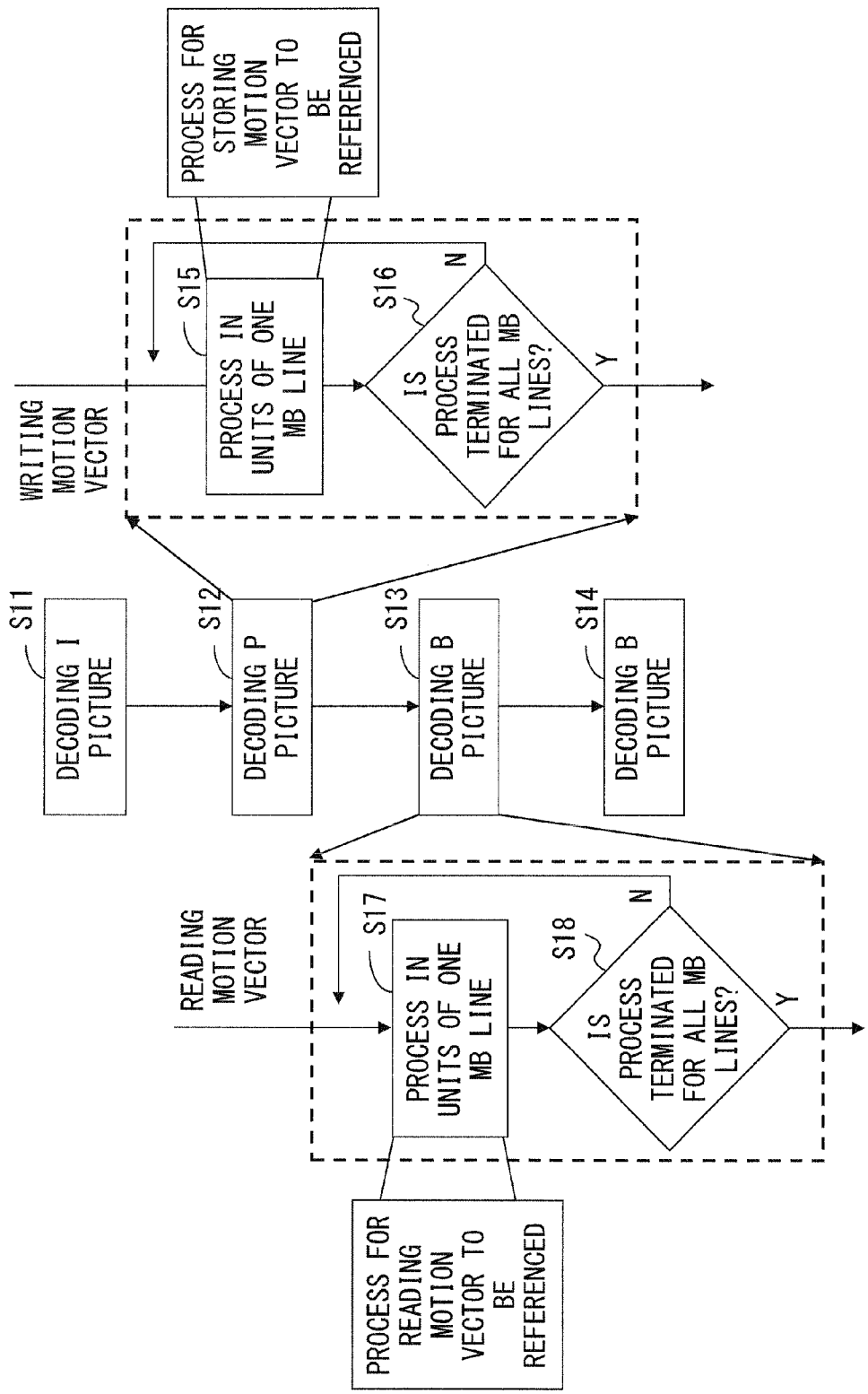
FIG. 13 is a flowchart illustrating a process for decoding the pictures illustrated in FIG. 12.

FIG. 13 is a flowchart illustrating a picture data decoding process executed in the decoding order of pictures illustrated in FIG. 12. Once the process is started in FIG. 13, a process for decoding an I picture is executed in step S11. In step S12, a process for decoding a P picture is executed. The process for decoding a P picture is executed in units of one macro block line in step S15, and is continued until it is determined in step S16 that it is terminated for all of macro block lines. In the process executed in units of one macro block line in step S15, a process for storing a motion vector to be referenced is executed for each macro block, as will be described later.

Upon termination of the process in step S12, a process for decoding a B picture is executed in step S13. This process is executed in units of one macro block line in step S17, and is continued until it is determined in step S18 that it is terminated for all the macro block lines. If the direct mode is used in the process executed in units of one macro block line in step S17, a process for reading a motion vector to be referenced for each macro block is executed. Then, the process for decoding the next B picture is executed last in step S14.

A method for storing error information in the memory, and processes for storing/reading motion vector information to be referenced in/from the memory in this embodiment are described next.

FIGS. 14 to 19 are explanatory views of the first embodiment. FIG. 14 is an explanatory view of a method for storing error information in the memory in the first embodiment. In this embodiment, motion vector information to be referenced is sequentially stored at and after a storage start position of motion vector information to be referenced for one macro block line within the memory, and error information is stored at a position immediately preceding the storage start position.

As the error information, an identifier (indicating error information, for example, with one particular word) is stored. Subsequently to the identifier, an empty area is stored. Subsequently to the empty area, an error flag indicating whether or not an error has occurred in a corresponding macro block line is stored. Subsequently to the error flag, error start macro block information and restoration address information are stored.

The error start macro block information indicates the number of a macro block (conceal start MB) for which the error concealment process (namely, the process for replacing the value of motion vector information to be referenced with "0") executed after rewinding macro blocks is to be started, when an error is detected from the macro block. The restoration address information indicates a memory address (next address pointer) at which motion vector information to be referenced for a macro block starts to be normally written and read as a normal process after the error concealment process (namely, the process for replacing, with "0", the value of the motion vector information to be referenced up to the macro block from which the error is detected) is executed.

Figure 15:
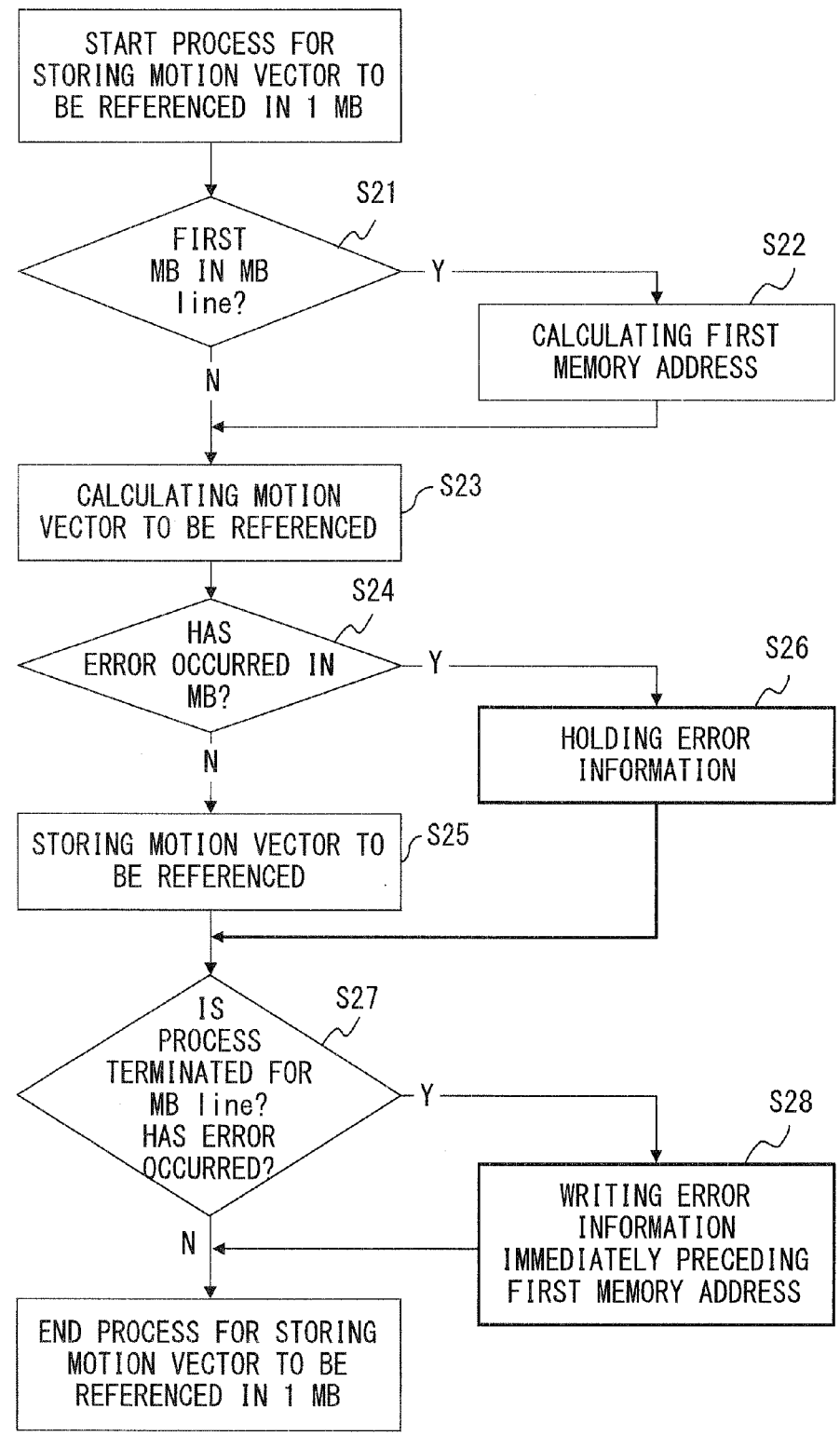
FIG. 15 is a flowchart illustrating a process for storing motion vector information to be referenced in the first embodiment.

FIG. 15 is a flowchart illustrating the process for storing a motion vector to be referenced for one macro block in the first embodiment. Once the process is started in FIG. 15, processes similar to steps S101 to S103 in FIG. 6 in the conventional example are executed in steps S21 to S23, and a motion vector to be referenced is calculated. In step S24, whether or not an error has occurred is determined. If the error has not occurred, the flow goes to step S27 after the data of the motion vector to be referenced is stored in the memory in step S25 in a similar manner as in the conventional example. If the error has occurred, the flow moves to step S27 after error information is held, for example, in a working area of the memory, which is not illustrated, in step S26. In step S27, whether or not the process has been terminated for the macro block line and whether or not an error has occurred in the macro blocks of the macro block line are determined. If these determination conditions are not satisfied, the process for storing a motion vector to be referenced for a macro block is immediately terminated. If these determination conditions are satisfied, the process for storing a motion vector to be referenced for a macro block is terminated after the error information is written to the first memory address (namely, a position immediately preceding the motion vector information storage start position in FIG. 14). Namely, the error information is written to the memory upon termination of the process for storing a motion vector to be referenced for all macro blocks of one macro block line in the first embodiment.

FIG. 16 is a flowchart illustrating the details of the error information holding process in step S26 of FIG. 15. In FIG. 16, whether or not the value of the error flag is "1", namely, whether or not the flag within the error information held in the above described working area is "1", is determined in step S30. If the value of the error flag is not "1", it is set to "1" in step S31. Then, whether or not the macro block rewinding process is necessary is determined in step S32. If the macro block rewinding process is necessary, the position of a rewound MB is stored as an error start macro block position in step S34. In step S35, a restoration address is stored. Then, the flow moves to step S27 after the restoration address is held in the working area as error information.

If the macro block rewinding process is not necessary in step S32, the flow moves to step S35 after data indicating the position of the current macro block is stored as an error start macro block position. If the value of the flag is already "1" in step S30, namely, if a macro block where it is determined that an error has occurred in the calculation of a motion vector to be referenced is included in one macro block line, the flow goes to step S27 after the restoration memory address is stored, namely, the restoration memory address is held as error information in step S35.

In claim 1 of the present invention, variable-length data corresponds to the data of a motion vector to be referenced for a macro block. Moreover, a predetermined position corresponds to the storage start position of FIG. 14. The earliest stored variable-length data corresponds to the data of a motion vector to be referenced for the error start macro block.

In claim 3, a predetermined number of pieces of variable-length data corresponds to the data of motion vectors to be referenced for macro blocks that configure one macro block line. claim 3 corresponds to the processes of FIGS. 15 and 16, which are executed when it is determined in step S30 of FIG.

16 that the error flag is not "1" and a restoration address is not updated. In the meantime, claim 5 corresponds to the process executed when the restoration address is updated.

Figure 17:
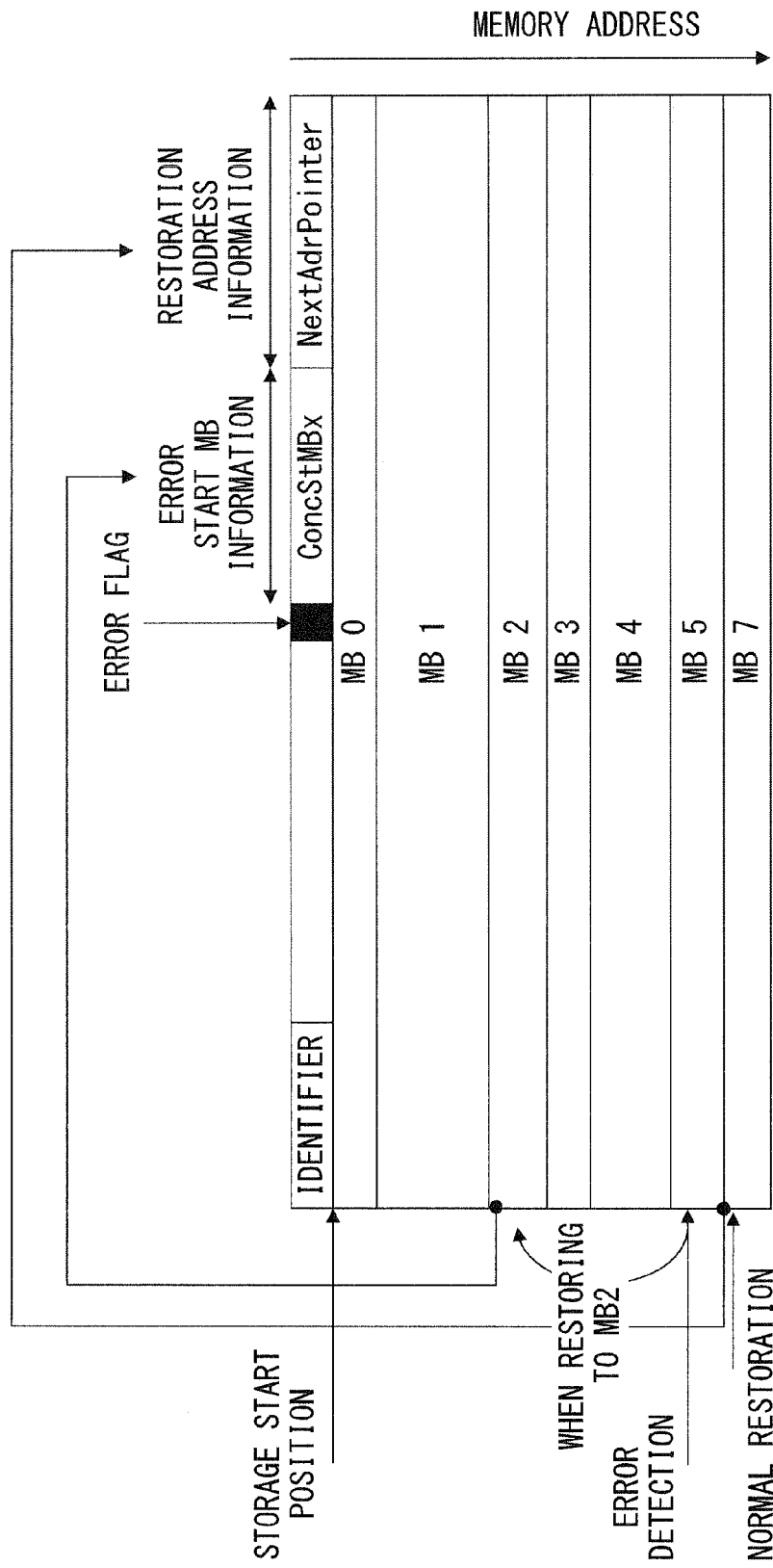
FIG. 17 is an explanatory view of an example of writing motion vector information to be referenced in the first embodiment.

FIG. 17 is an explanatory view of an example of writing motion vector information to be referenced in the memory by executing the process of FIG. 15. In FIG. 17, assume that an error is detected in the storing process executed for the macro block 5 after the process starts at the storage start position and the data of motion vectors to be referenced for the macro blocks 0 to 4 are stored.

The motion vector to be referenced for the macro block 5 from which the error is detected is not stored in the process of FIG. 15. At the point in time at which the motion vector to be referenced for the macro block 5 is calculated in step S23, the size of the area for storing the data of the motion vector is identified. Accordingly, assume here that the area for storing the motion vector to be referenced for the macro block 5 is secured by the corresponding area size in the memory, and that the data of the motion vector to be referenced is not actually stored. However, the first address of the area where the data of a normal motion vector to be referenced for the macro block 5 is to be stored is an address next to the end address of the area where the motion vector to be referenced for the macro block 5 is to be stored. The value of the address next to the end address is held as restoration address information in error information.

If an error is detected from the macro block 5 and the error concealment process is to be executed after rewinding to the macro block 2, the number of the macro block to be rewound is held as the error start (MB) position information. Upon termination of the process for storing a motion vector to be referenced for one macro block line (here, upon termination of the process for storing a motion vector to be referenced for, for example, the macro block 7), the error information is written to a position immediately preceding the storage start position. Naturally, the data of the macro block 7 may be stored in the area for storing data for, for example, the macro block 5 from which the error is detected without securing this area in the memory. In this case, the start address of that area is recognized as a restoration address.

Figure 18:
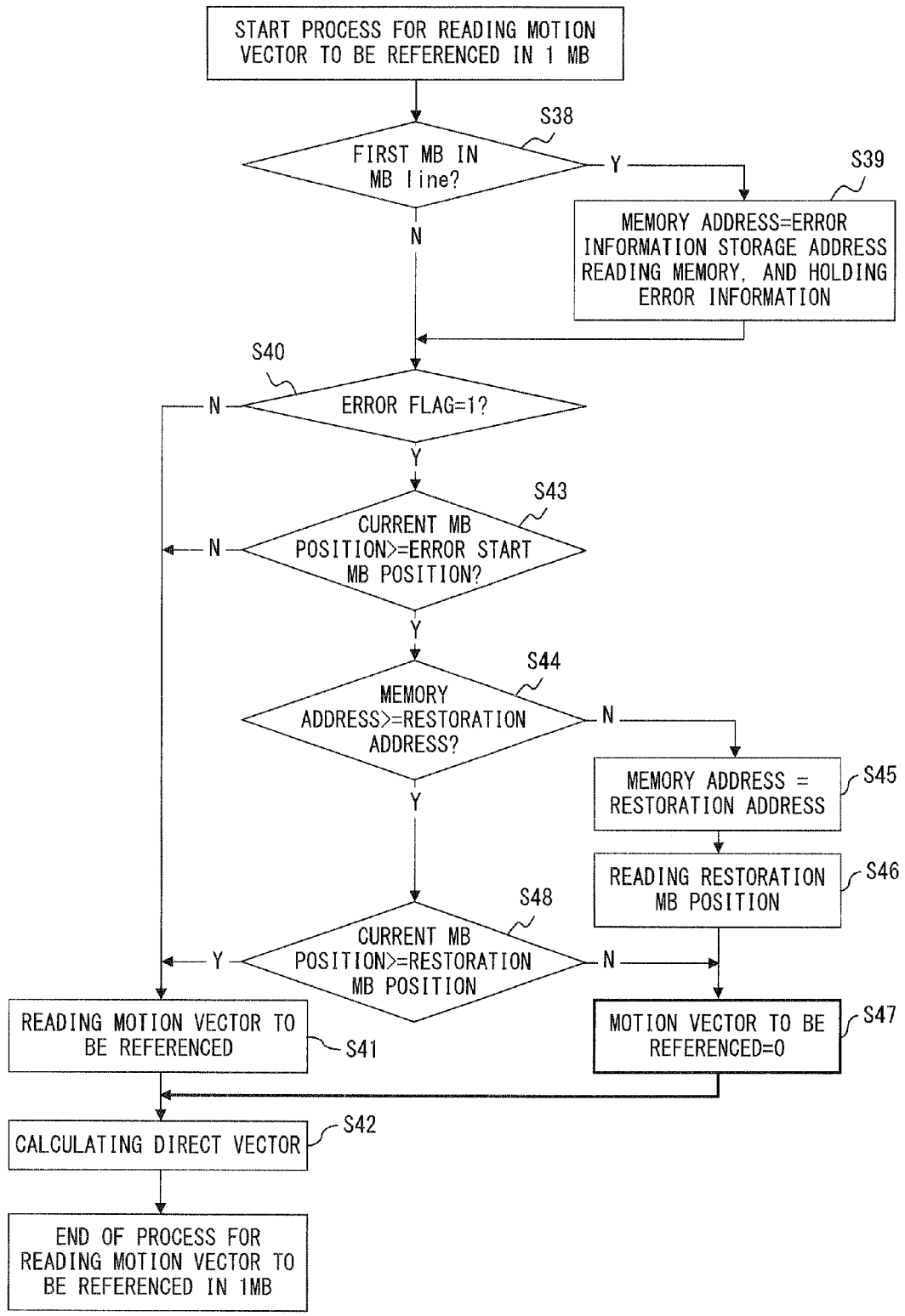
FIG. 18 is a flowchart illustrating a process for reading motion vector information to be referenced in the first embodiment.

FIG. 18 is a flowchart illustrating the process for reading a motion vector to be referenced in the first embodiment. Once the process is started in FIG. 18, whether or not this process is a process for the first macro block of a macro block line is determined in step S38. If this process is the process for the first macro block, the memory is read by recognizing a memory address as an error information storage address in step S39. Then, the flow goes to step S40 after the read error information is held, for example, in the working area. If this process is not the process for the first macro block of the macro block line, then the flow immediately goes to the process of step S40.

In step S40, whether or not the value of the error flag within the already held error information is "1" is determined. If the value of the error flag is not "1", the data of a motion vector to be referenced is read in step S41. Thereafter, a direct vector is calculated in step S42, and the process for reading a motion vector to be referenced for the macro block is terminated.

Figure 19:
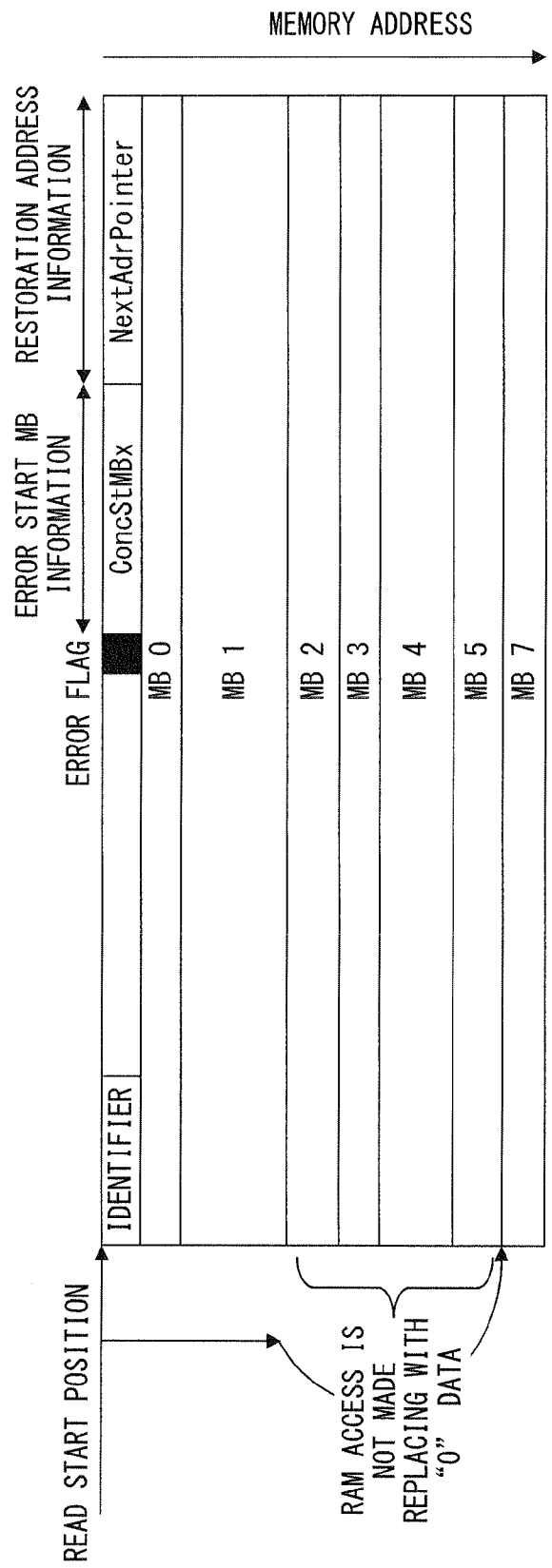
FIG. 19 is an explanatory view of an example of reading motion vector information to be referenced in the first embodiment.

FIG. 19 is an explanatory view of an example of reading motion vector information to be referenced. If the value of the error flag stored at the beginning in FIG. 19 is "1" in step S40 of FIG. 18, this means that a macro block where an error has occurred exists in the macro block line including the macro block currently being processed. In this case, whether or not the position of the current macro block (namely, the macro block 0 in FIG. 19) is equal to or later than the error start macro block position is determined in step S43. As described above with reference to FIG. 17, the macro block which is to be rewound from the macro block 5, from which the error is detected and for which the error concealment process is to be started, is the macro block 2, and the position of the current macro block has not reached the macro block 2 yet. Therefore, processes in and after step S41 are executed.

In the process for the macro block 2, it is determined in step S43 that its position is equal to or later than the position of the error start macro block. Then, whether or not the memory address currently being read is equal to or later than the restoration address is determined in step S44. Here, the restoration address is an address indicating the beginning of, for example, the macro block 7 as described with reference to FIG. 17. Here, since this address has not been reached yet, the memory address is determined as the restoration address in step S45. Thereafter, the macro block at that position, namely, the position of the restoration macro block (here, the number of the macro block 7), is read in step S46. The flow goes to step S42 after the value of the motion vector to be referenced for the macro block currently being processed, namely, the macro block 2, is replaced with "0" in step S47.

In the process executed for the next macro block 3, it is determined in step S44 that its memory address has reached the restoration address. This is because the memory address is determined as the restoration address in step S45 in the process executed for the macro block 2. As a result, whether or not the position of the current macro block is equal to or later than the position of the restoration macro block is determined in step S48. In step S47, the value of the motion vector to be referenced is replaced with "0".

For the subsequent macro blocks 4 to 6, processes similar to those for the macro block 3 are executed in steps S43, S44, S48, and S47. As a result, the value of the motion vector to be referenced is replaced with "0". Thereafter, a direct vector is calculated in step S42.

In the processes for the macro block 7, it is determined in step S48 that the position of the current macro block has reached the restoration macro block after the processes in steps S43 and S44 are executed. Thereafter, the data of a motion vector to be referenced for the macro block 7 is read in step S41. Then, a direct vector is calculated in step S42.

As described above, the first embodiment eliminates the need to rewrite motion vector data to "0" as the error concealment process for a motion vector to be referenced for a macro block, the motion vector information to be referenced of which is already stored, in order to cope with an error even if the error occurs in the macro block when the motion vector information to be referenced is stored. Moreover, when the motion vector information to be referenced is read, substantial memory accesses become unnecessary in a range from a macro block at a rewound position to a position preceding the next area for storing motion vector information for a macro block where no error has occurred. For these areas, a direct vector may be calculated by using "0" as the data of a motion vector to be referenced.

A second embodiment is described next. In FIG. 16, which is related to the first embodiment, a restoration memory address is stored in step S35 if the value of the error flag (namely, the value of the error flag held in the working area or the like of the memory, which is not illustrated, before being written to the first memory address in step S28) is "1" in step S30.

In FIG. 17, one macro block line is considered to end in, for example, the macro block 7. However, assume here that an error occurs again, for example, in a subsequent macro block 9 if the number of macro blocks within one macro block line is larger. At that time, the value of the error flag is held to be "1" and the restoration address is overwritten in step S35. Assuming that an error has occurred also in a macro block 10 and no error has occurred in a macro block 11, there is no area to which the motion vector to be referenced for the macro block 10 is written. In this case, the restoration address overwritten in step S35 is an address (namely, the first address of the area for storing the motion vector for the macro block 11) next to the end address of the area for storing the motion vector for the macro block 9.

As a result, the memory address is determined as the first address of the area for storing the motion vector to be referenced for the macro block 11 as a restoration address in step S45 of the process for reading a motion vector to be referenced in FIG. 18. Accordingly, the position of the restoration macro block read in step S46 points to the macro block 11. As a result, as described above, the value of a motion vector to be referenced is overwritten with "0" for all the macro blocks 3 to 10 in step S47 after the processes of steps S44 and S48 are executed. Thereafter, a direct vector is calculated in step S42. Namely, the value of a motion vector to be referenced is overwritten with "0" also in the memory area for storing the value of the motion vector to be referenced, which is properly calculated for the macro blocks 7 and 8 from which no error is detected.

The second embodiment relates to the above described point. FIG. 20 is an explanatory view of an error information storage format in the second embodiment. Compared with FIG. 14, which is related to the first embodiment, restoration macro block information (start MB) is additionally stored as error information in FIG. 20. The restoration macro block information corresponds to the number of a macro block specified by the restoration address information. In the example of FIG. 17, the macro block 7 is at the position of the restoration macro block. Moreover, in the second embodiment, the restoration address information, namely, the value of the first address in the area for storing the motion vector information to be referenced for the macro block 7, is not overwritten and updated. As described above, if an error has occurred again, for example in the macro block 9, the error information itself is newly written to the memory, as will be described later.

Figure 21:
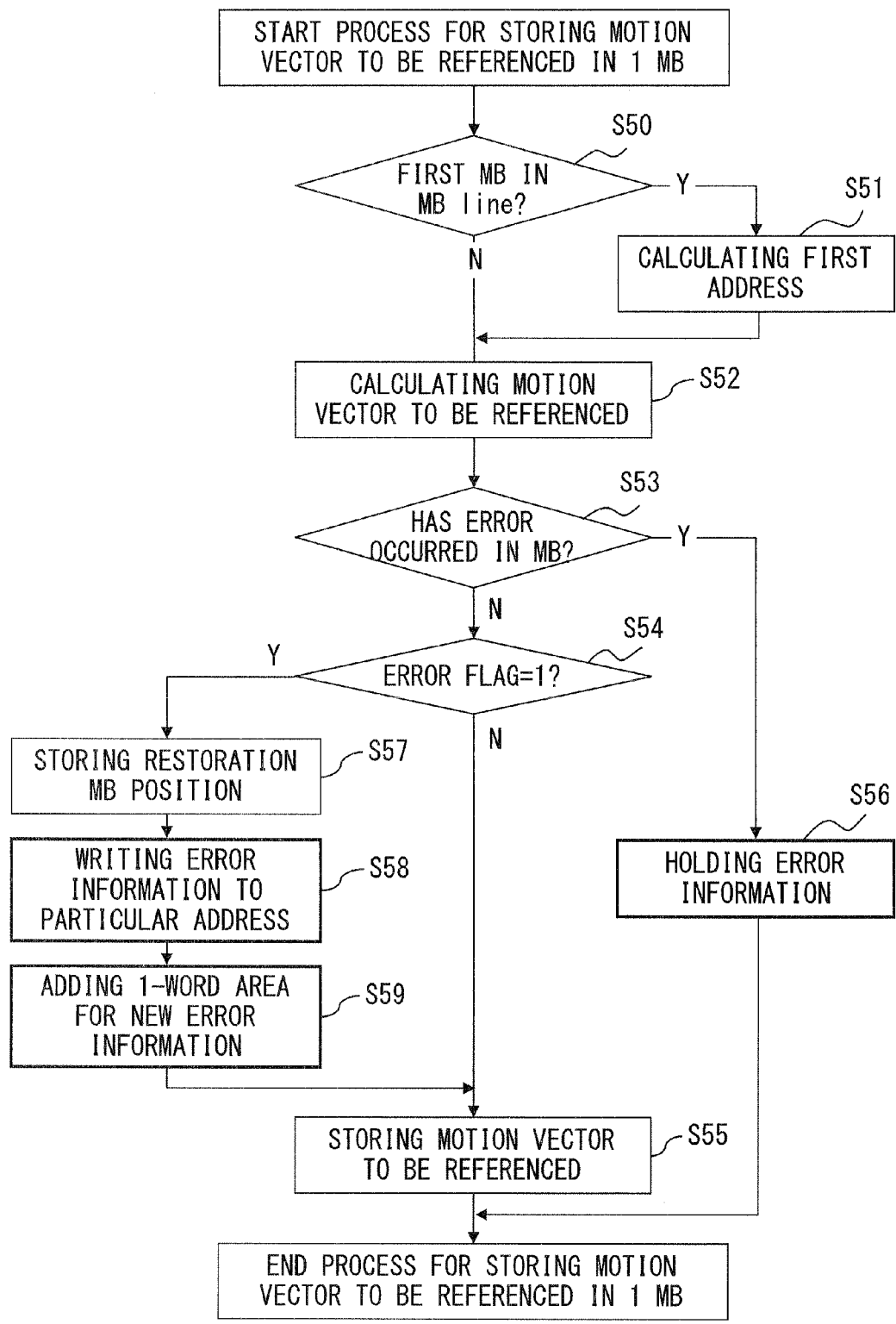
FIG. 21 is a flowchart illustrating a process for storing motion vector information to be referenced in the second embodiment.
Figure 22:
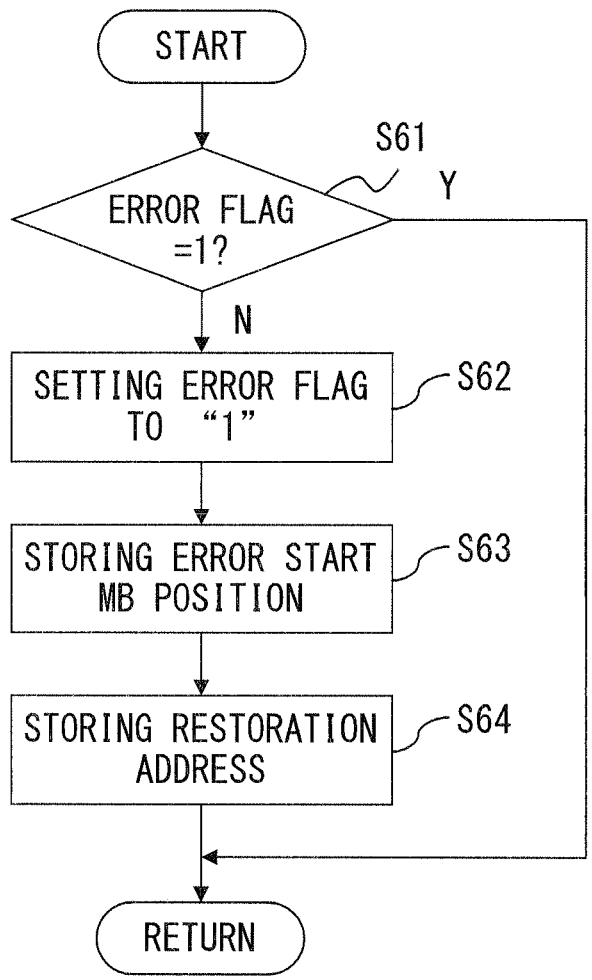
FIG. 22 is a flowchart illustrating the details of an error information holding process in FIG. 21.

FIGS. 21 and 22 are flowcharts illustrating the process for storing a motion vector to be referenced in the second embodiment. These process flowcharts are described by using an example of writing motion vector information to be referenced in FIG. 23. Additionally, differences from the first embodiment are mainly described.

In FIG. 21, processes in steps S50 to S53 are similar to those of FIG. 15 in the first embodiment. If it is determined in step S53 that an error has not occurred, whether or not the value of the error flag for the portion to which the macro block currently being processed belongs is already "1" in one macro block line is determined in step S54, as will be described later. If the value is not "1", the data of a motion vector to be referenced is stored in the memory in step S55. Thereafter, the process for storing the motion vector to be referenced for the macro block is terminated.

If it is determined in step S53 that the error has occurred, error information is held in step S56. In the flow illustrating the details of this process in FIG. 22, processes similar to those of FIG. 16 related to the first embodiment are executed. However, the process for storing a restoration address in step S64 is different from the process of FIG. 16 in that the process in step S64 is executed only once if it is determined in step S61 that the value of the error flag is not "1". Naturally, in a process for storing the position of an error start macro block in step S63, the position of a different macro block may be stored depending on whether or not the macro block rewinding process is to be executed in a similar manner as in steps S32 to S34 of FIG. 16. Unlike FIG. 15 related to the first embodiment, the process for the macro block is immediately terminated upon termination of holding the error information.

Figure 23:
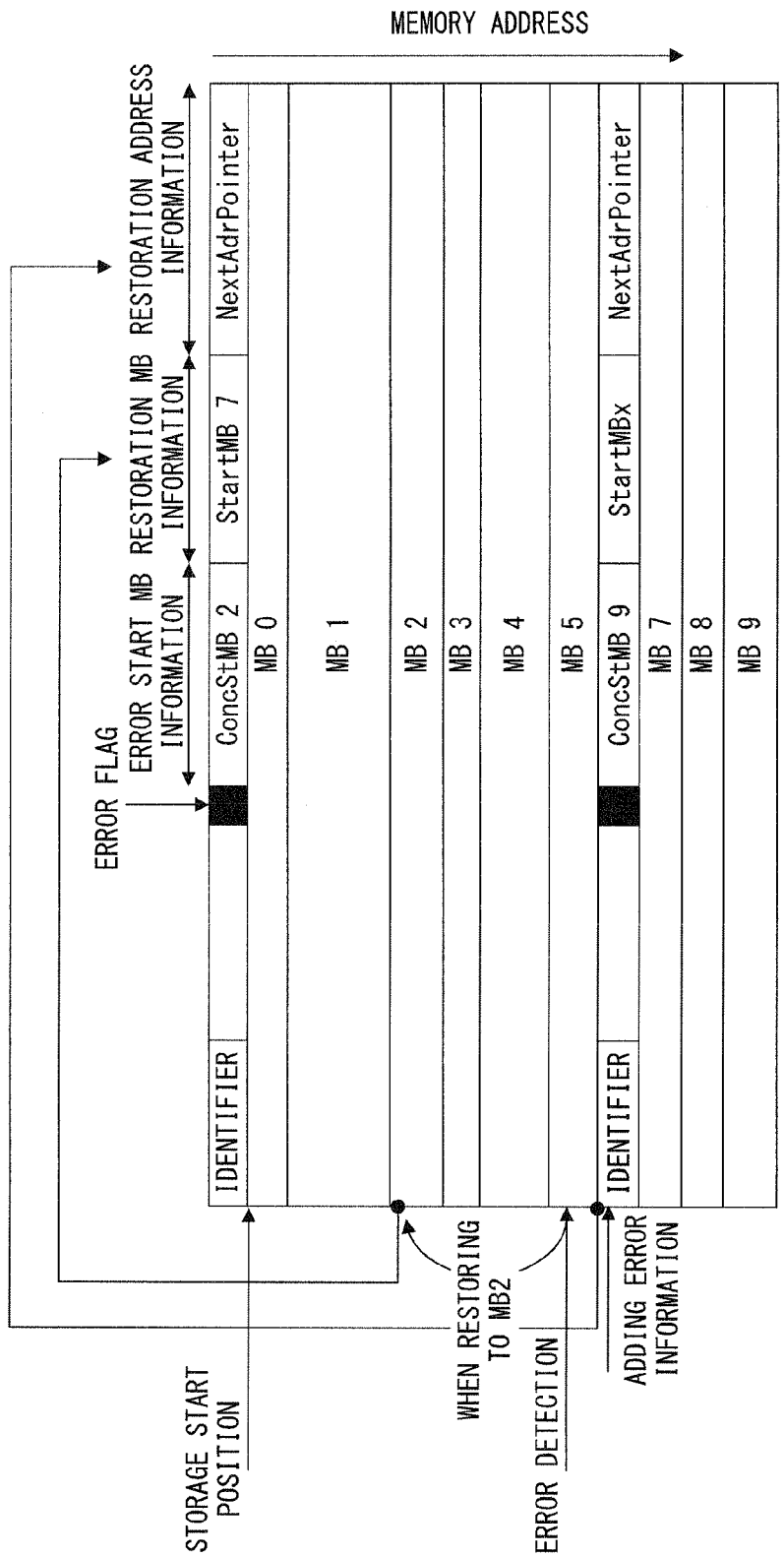
FIG. 23 is an explanatory view of an example of writing motion vector information to be referenced by executing the process of FIG. 21.

The case where it is determined in step S54 that the error flag is "1" occurs in the process for the macro block 7 in FIG. 23. Namely, an error is detected in the macro block 5, and the error information is held in step S56. Thereafter, no process is substantially executed as the process for the macro block 6 in step S56 because an error has occurred. Thereafter, it is determined in step S53 that no error has occurred in the process for the macro block 7. Then, it is determined in step S54 that the value of the error flag is "1".

In such a case, the position of a restoration macro block is stored, for example, in the working area in step S57. The position of the restoration macro block points to the macro block 7. In step S58, error information including the position of the restoration macro block is written to a particular address (here, an address immediately preceding the start position of the area for storing motion vector information to be referenced for one macro block line). In step S59, one word is added as the area for storing new error information. In step S55, the process for storing the motion vector to be referenced for the macro block 7 is executed. Then, the process for the macro block 7 is terminated. The one word added in step S59 is positioned immediately preceding the area for storing the motion vector to be referenced for the macro block 7. If an error has occurred in the processes for the macro block 8 and subsequent macro blocks, a one-word area is added as an area for storing corresponding error information.

Figure 24:
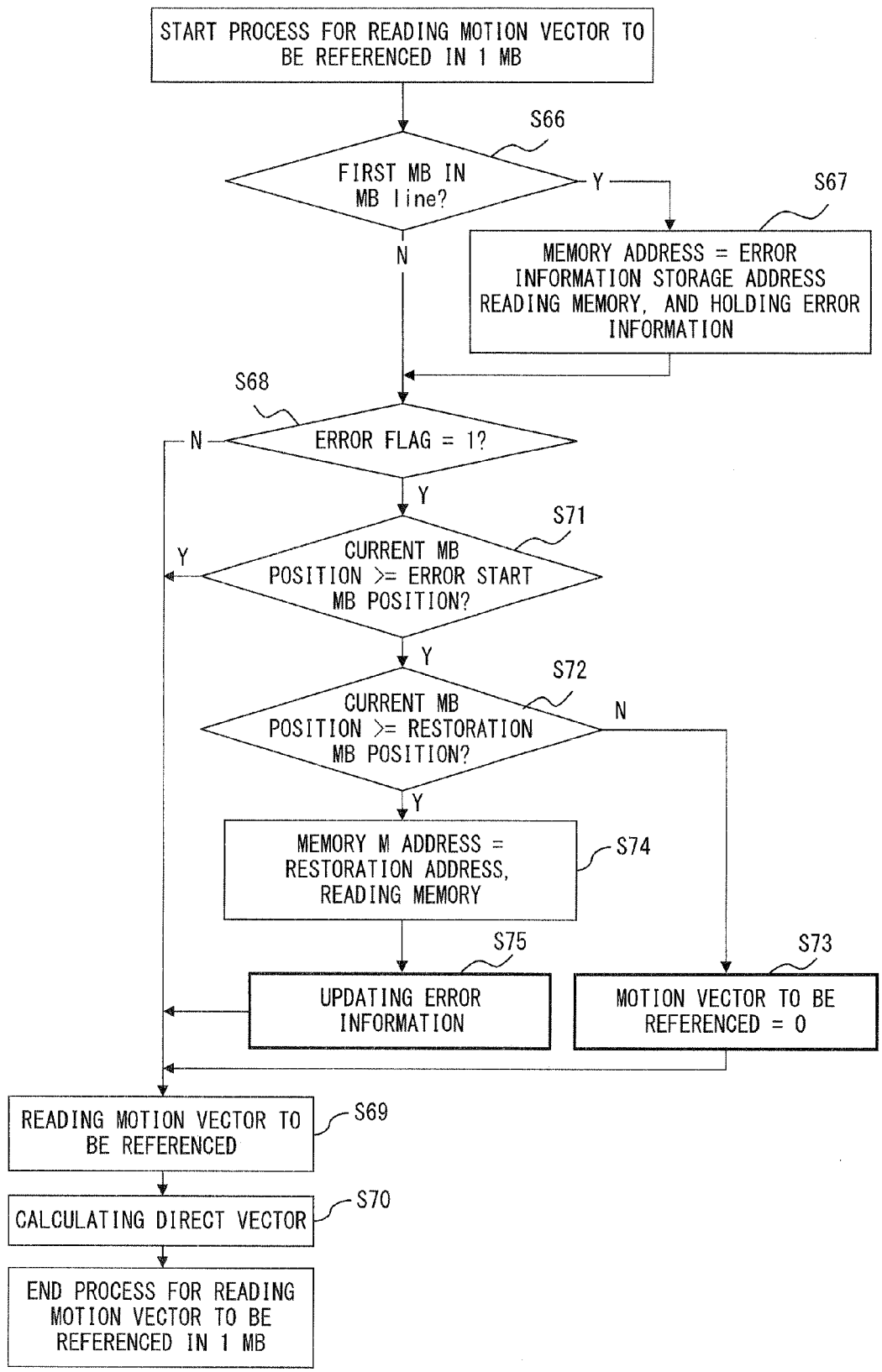
FIG. 24 is a flowchart illustrating a process for reading motion vector information to be referenced in the second embodiment.

FIG. 24 is a flowchart illustrating the process for reading a motion vector to be referenced in the second embodiment. FIG. 25 is an explanatory view of an example of the read process. Differences between FIGS. 24 and 25 and FIGS. 18 and 19 related to the first embodiment are mainly described.

Once the process is started in FIG. 24, processes similar to those in FIG. 18 are executed in steps S66 to S71. If it is determined in step S71 that the position of the current macro block has not reached the position of an error start macro block, the data of a motion vector to be referenced is read in step S69. Thereafter, a direct vector is calculated in step S70. Then, the process for reading the motion vector to be referenced for the macro block is terminated.

In the process for the macro block 2 in FIG. 25, whether or not the macro block is the error start macro block or whether or not the position of the current macro block has reached the position of the restoration macro block is determined in step S72. The position of the restoration macro block is stored as described in step S57 of FIG. 21 if an error has not occurred in the corresponding macro block and it is determined in step S54 that the value of the error flag is "1". In FIG. 23, this value points to the macro block 7. Accordingly, the position of the current macro block 2 has not reached the position of the macro block 7 yet as a matter of course. Accordingly, the value of the motion vector to be referenced is overwritten with "0" in step S73. Thereafter, that value is read in step S69. Then, in step S70, the value is used to calculate a direct vector. In the processes for the macro blocks 5 and 6 in FIG. 25, the value of the motion vector to be referenced is similarly determined to be "0" in step S73.

When the position of the macro block currently being processed has reached the position of the restoration macro block (namely, the macro block 7), the memory address is recognized as a restoration address in step S74, and the memory is read. As described in step S64 of FIG. 22, the memory address read at that time is an address next to the end address of the area where the motion vector information to be referenced for the macro block 5 is to be stored. This address points to a one-word area for storing new error information added in step S59 of FIG. 21. At the memory address read here, new error information is stored. By using the new error information, the error information is updated (namely, the new error information is held) in step S75. Then, in step S69, the motion vector to be referenced for the macro block 7 is read.

Namely, if the process for rewinding up to the macro block 9 becomes necessary when an error occurs, for example in the macro block 11 in FIG. 23, corresponding error start macro block information, restoration macro block information, and restoration address information are stored in the area that is added in step S59 of FIG. 21 and intended to store the new error information in the process of step S58, for example for the macro block 12 where no error has occurred. The error information is read from the memory in step S74 of FIG. 24. Thereafter, the first error information held in step S67 is overwritten.

Claim 7 corresponds to the processes of FIGS. 21 and 22 in the second embodiment. Claim 8 corresponds to the process of FIG. 24.

As described above, in the second embodiment, even if an error occurs in a plurality of nonconsecutive macro blocks within a macro block line, the error concealment process for the macro block line can be properly executed.

A method for storing variable-length data in a memory according to one embodiment of the present invention is a method for sequentially storing, in a memory, a plurality of pieces of variable-length data, for example motion vector data to be referenced for a plurality of macro blocks in one macro block line.

With this method, error detection is made for the variable-length data, variable-length data from which an error is not detected is sequentially stored at and after a predetermined position within the memory, and error information including a restoration address at which variable-length data from which no error is detected is to be stored next is written, correspondingly to an area within the memory to which the variable-length data from which an error is detected is to be written, to a position preceding the predetermined position when the error is detected from the variable-length data.

Error information in one embodiment of the present invention is information that not only includes the above described restoration address but specifies the earliest input variable-length data from among variable-length data to be replaced with error concealment data on the basis of detected error information.

A variable-length data storing device according to one embodiment of the present invention is a data storing device for storing variable-length data using such a method for storing variable-length data in a memory.

According to one embodiment of the present invention, if an error is detected from variable-length data to be written to the memory, variable-length data ranging from the earliest input variable-length data to variable-length data preceding the variable-length data stored at the above described restoration address is replaced with, for example, "0" as error concealment data and is output when being read on the basis of error information that includes a restoration address corresponding to a memory area to which the variable-length data is to be written and that specifies the earliest input variable-length data from among variable-length data to be replaced with error concealment data. As a result, the need for the above described macro block rewinding process is eliminated, leading to a significant reduction in the processing time for memory accesses.

As described above, with the method for storing information of a motion vector to be referenced in a memory as variable-length data according to one embodiment of the present invention, the process for rewinding a macro block in order to rewrite motion vector information for macro blocks that is already stored in the memory becomes unnecessary if an error has occurred in a macro block. Accordingly, the amount of processing for memory accesses can be reduced. Moreover, the process for reading, from the memory, "0" as error concealment data written to the memory substantially also becomes unnecessary. As a result, the efficiency of the processing for memory accesses made in a direct mode calculation can be increased. Accordingly, the embodiments according to the present invention highly contribute to an increase in the processing efficiency of a moving picture decoding apparatus adopting the direct mode.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an indication of the superiorities and inferiorities of the invention. Although the embodiments of the present invention have been described in detail, it should be understood that various changes, substitutions, and alterations could be made hereto without departing from the spirit and the scope of the invention.

What is claimed is:

1. A method for storing variable-length data in a memory, comprising:
   detecting an error from provided variable-length data;
   sequentially storing variable-length data from which an error has not been detected at and after a predetermined position in the memory; and
   storing, in the memory, error information that correspondingly includes a restoration address at which variable-length data from which an error has not been detected is to be stored after an area of the memory where the variable-length data from which the error is detected is to be stored, and that specifies variable-length data stored earliest in the memory from among variable-length data to be replaced with error concealment data in order to cope with an error, when the error is detected.

2. A method for outputting variable-length data stored in a memory with the method according to claim 1, comprising:
   referencing error information stored in the memory;
   outputting a value read from the memory for variable-length data ranging from the predetermined position to a position preceding the earliest stored variable-length data from among the variable-length data from which an error has not been detected; and
   outputting a value of variable-length data that ranges from the earliest stored variable-length data to an address preceding the restoration address and that is stored in the memory, and outputting a value of variable-length data that is not stored in the memory after replacing the value with "0".

3. The method for storing variable-length data in a memory according to claim 1, further comprising:
   holding the error information that includes the restoration address and that specifies the earliest stored variable-length data when the error is detected; and repeatedly detecting an error from variable-length data until a number of pieces of the variable-length data reach a predetermined number, repeatedly storing, in the memory, variable-length data from which an error is not detected, and storing the held error information in the memory after terminating a process including error detection for the predetermined number of pieces of variable-length data.

4. A method for outputting variable-length data stored in a memory with the method according to claim 3, comprising:
referencing error information stored in the memory;
outputting a value read from the memory for variable-length data ranging from the predetermined position to a position preceding the earliest stored variable-length data, and for variable-length data stored in an area succeeding the restoration address from among variable-length data from which an error is not detected; and
outputting the value of the variable-length data by replacing the value with "0" for variable-length data that ranges from the earliest stored variable-length data to the address preceding the restoration address and that is stored in the memory, and for variable-length data that is not stored in the memory.

5. The method for storing variable-length data in a memory according to claim 3, wherein
the restoration address included in the error information is updated to a new address that specifies a position at which variable-length data from which an error is not detected is to be stored after variable-length data from which the error is newly detected without storing, in the memory, the variable-length data from which the error is newly detected by performing the error detection for the variable-length data until the number of pieces of the variable-length data reaches the predetermined number.

6. A method for outputting variable-length data stored in a memory with the method according to claim 5, comprising:
referencing error information stored in the memory;
outputting a value, which is read from the memory, for variable-length data ranging from the predetermined position to a position preceding the earliest stored variable-length data, and for variable-length data stored in an area succeeding the updated restoration address from among the variable-length data from which an error is not detected; and
outputting the value of variable-length data after replacing the value with "0" for the variable-length data that ranges from the earliest stored variable-length data to the address preceding the updated restoration address and is stored in the memory, and for the variable-length data that is not stored in the memory.

7. The method for storing variable-length data in a memory according to claim 1, further comprising:
holding the error information that includes the restoration address and specifies the earliest stored variable-length data, when the error is detected;
detecting an error from further provided variable-length data, not storing, in the memory, variable-length data from which an error has been detected, adding to the error information data indicating next variable-length data upon detection of the next variable-length data from which an error has not been detected, and storing the error information to which the data is added;
storing the next variable-length data in the memory after securing a storage area for the next error information at an address specified by the restoration address; and
repeating a process for detecting an error from the further provided variable-length data, for storing the error information to which the data is added in the area for storing the next error information, for securing the area for storing the next error information, and for storing the next variable-length data in the memory.

8. A method for outputting variable-length data stored in a memory with the method according to claim 7, comprising:
referencing first error information stored at a position preceding the predetermined position within the memory;
outputting a value, which is read from the memory, for variable-length data ranging from the predetermined position to a position preceding the earliest stored variable-length data from among the variable-length data from which the error is not detected;
outputting the value of the variable-length data after replacing the value with "0" for the variable-length data that ranges from the earliest stored variable-length data to a position preceding the area for storing the next error information and that is stored in the memory, and for the variable-length data that is not stored in the memory; and
repeating a process for referencing the error information stored in the area for storing the next error information, for outputting the value read from the memory for the variable-length data from which an error is not detected, and for outputting the value of the variable-length data after replacing the value with "0".

9. The method for storing variable-length data in a memory according to claim 1, wherein
the variable-length data is data of each partitioned block, and
the predetermined position is a first address of a fixed-length area, at which variable-length data corresponding to each of the plurality of blocks within a block line that is configured with the plurality of blocks is to be stored.

10. The method for storing variable-length data in a memory according to claim 9, wherein
the plurality of blocks are blocks into which moving picture data is partitioned, and from which data of a motion vector for each of the plurality of blocks of the variable-length data is obtained.

11. The method for storing variable-length data in a memory according to claim 1, the method being used by a moving picture decoding apparatus adopting a motion compensation method, and the variable-length data being data of a motion vector to be referenced in the motion compensation method.

12. The method for storing variable-length data in a memory according to claim 11, wherein
a direct mode motion prediction method is used as the motion compensation method.

13. The method for storing variable-length data in a memory according to claim 12, wherein
the variable-length data corresponds to each block into which moving picture data is partitioned in the direct mode motion prediction method, and is data of motion vectors to be referenced, the number of which varies.

14. A variable-length data storing device, wherein:
variable-length data from which an error is not detected from among provided variable-length data is sequentially stored at and after a predetermined position in a continuous area; and
error information that correspondingly includes a restoration address at which variable-length data from which an error is not detected is to be stored after an area where the variable-length data is to be stored, and that specifies earliest stored variable-length data from among variable-length data to be replaced with error concealment data in order to cope with an error is stored when the error is detected from the provided data.

15. The variable-length data storing device according to claim 14, wherein:
the error information is stored;
error detection is made for further provided variable-length data, variable-length data from which an error is detected is not stored, data indicating the next variable-length data is added to the held error information upon detection of next variable-length data from which an error is not detected, and the error information to which the data is added is stored at a position preceding the predetermined position;
the next variable-length data is stored after an area for storing the next error information is secured at an address specified by the restoration address; and
a process for detecting an error from the provided variable-length data, for storing the error information to which the data is added in the area for storing the next error information, for securing the area for storing the next error information, and for storing the next variable-length data is repeated.

* * * * *